United States Patent
Huang et al.

(10) Patent No.: US 11,533,733 B2
(45) Date of Patent: Dec. 20, 2022

(54) PAYLOAD MULTIPLEXING WITH ORTHOGONAL SEQUENCES

(71) Applicant: QUALCOMM Incorporated, San Diego, CA (US)

(72) Inventors: Yi Huang, San Diego, CA (US); Wanshi Chen, San Diego, CA (US); Peter Gaal, San Diego, CA (US); Wei Yang, San Diego, CA (US); Hwan Joon Kwon, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 17/242,120

(22) Filed: Apr. 27, 2021

(65) Prior Publication Data
US 2021/0337556 A1 Oct. 28, 2021

Related U.S. Application Data

(60) Provisional application No. 63/016,885, filed on Apr. 28, 2020.

(51) Int. Cl.
*H04W 4/00* (2018.01)
*H04W 72/10* (2009.01)
(Continued)

(52) U.S. Cl.
CPC .......... *H04W 72/10* (2013.01); *H04B 7/0456* (2013.01); *H04L 5/0007* (2013.01)

(58) Field of Classification Search
CPC ..... H04W 72/10; H04B 7/0456; H04L 5/0007
See application file for complete search history.

(56) References Cited

U.S. PATENT DOCUMENTS

2020/0068422 A1 * 2/2020 Wang .................. H04B 7/0628

FOREIGN PATENT DOCUMENTS

| WO | WO-2008018711 A2 * | 2/2008 | ........... H04L 1/0027 |
| WO | WO-2018144470 A1 * | 8/2018 | ............... H04B 7/04 |
| WO | WO-2020167018 A1 * | 8/2020 | ............. H04L 1/001 |

OTHER PUBLICATIONS

Cohere Technologies: "Design of Long-PUCCH for UCI of more than 2 bits", 3GPP Draft, 3GPP TSG-RAN WG1 NR Ad Hoc Meeting #2, R1-1711251, Design of Long-PUCCH for UCI of more than 2 bits, 3rd Generation Partnership Project (3GPP), Mobile Competence Centre, 650, Route Des Lucioles, F-06921 Sophia-Antipolis Cedex, vol. Ran WG1, No. Qingdao, China, Jun. 27, 2017-Jun. 30, 2017, Jun. 17, 2017 (Jun. 17, 2017), XP051305506, 5 Pages, Retrieved from the Internet: URL: http://www.3gpp.org/ftp/tsg_ran/WG1_RL_1/TSGR1_AH/NR_AH_1706/Docs/. [Retrieved on-Jun. 17, 2017] paragraph [0002].

(Continued)

*Primary Examiner* — Chi H Pham
*Assistant Examiner* — Elisabeth Benoit Magloire
(74) *Attorney, Agent, or Firm* — Holland & Hart LLP/Qualcomm Incorporated

(57) ABSTRACT

Methods, systems, and devices for wireless communications are described. For instance, a UE or base station may identify a first portion of a payload associated with a first priority and a second portion of the payload associated with a second priority less than the first priority. The UE or base station may select a first matrix associated with a first domain for the first portion of the payload and a second matrix associated with a second domain for the second portion of the payload based on a first maximum index interval for the first matrix being larger than a second maximum index interval for the second matrix. The UE may transmit or the base station may receive the first portion of the payload using one or more sequences associated with the (Continued)

first matrix and the second portion of the payload using one or more sequences associated with the second matrix.

30 Claims, 20 Drawing Sheets

(51) Int. Cl.
*H04B 7/0456* (2017.01)
*H04L 5/00* (2006.01)

(56) References Cited

OTHER PUBLICATIONS

Ericsson: "Evaluation Results for Enhanced PUCCH and PRACH Designs", 3GPP Draft, 3GPP TSG-RAN WG1 Meeting #98bis, R1-1910952, Evaluation Results for Enhanced PUCCH and PRACH Designs, 3rd Generation Partnership Project (3GPP), Mobile Competence Centre, 650, Route Des Lucioles, F-06921 Sophia-Antipolis, vol. RAN WG1, No. Chongqing, China, Oct. 14, 2019-Oct. 20, 2019, Oct. 8, 2019 (Oct. 8, 2019), XP051809250, 24 Pages, Retrieved from the Internet: URL: https://ftp.3gpp.org/tsg_ran/WG1_RL1/TSGR1_98b/Docs/R1-1910952.zip-R1-1910952 Evaluation results for enhanced PUCCH and PRACH designs.docx [retrieved on Oct. 8, 2019] paragraph [2.2.1].
International Search Report and Written Opinion—PCT/US2021/029656—ISA/EPO—dated Jul. 23, 2021.

\* cited by examiner

PAYLOAD MULTIPLEXING WITH ORTHOGONAL SEQUENCES

CROSS REFERENCE

The present application for patent claims the benefit of U.S. Provisional Patent Application No. 63/016,885 by Huang et al., entitled "PAYLOAD MULTIPLEXING WITH ORTHOGONAL SEQUENCES," filed Apr. 28, 2020, assigned to the assignee hereof, and expressly incorporated by reference herein.

FIELD OF TECHNOLOGY

The following relates generally to wireless communications and more specifically to payload multiplexing with orthogonal sequences.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may transmit a signal to a base station including a payload. In some cases, the UE may transmit the payload in a resource allocation according to a selected non-orthogonal sequence, which the UE may select out of a set of non-orthogonal sequences. Non-orthogonal sequences may introduce interference or otherwise cause a decrease in reception accuracy or reliability at the base station.

SUMMARY

The described techniques relate to improved methods, systems, devices, and apparatuses that support payload multiplexing with orthogonal sequences. Generally, the described techniques provide for a user equipment (UE) or base station to select matrices for different portions of a payload (e.g., an uplink control information message) according to a priority of the portion of the payload and a maximum index interval associated with each matrix. For instance, the UE may identify a first portion of a payload and a second portion of the payload, where the first portion of the payload is associated with a first priority and the second portion of the payload is associated with a second priority that is less than the first priority. The UE may select a first matrix associated with a first domain for transmitting the first portion of the payload and a second matrix associated with a second domain for transmitting the second portion of the payload based on a first maximum index interval for the first matrix being larger than a second maximum index interval for the second matrix. The UE may transmit the first portion of the payload using one or more sequences associated with the first matrix and the second portion of the payload using one or more sequences associated with the second matrix.

Additionally or alternatively, a base station may identify a first portion of a payload and a second portion of the payload, where the first portion of the payload is associated with a first priority and the second portion of the payload is associated with a second priority less than the first priority. The base station may select a first matrix associated with a first domain for transmitting the first portion of the payload and a second matrix associated with a second domain for transmitting the second portion of the payload based on a first maximum index interval for the first matrix being larger than a second maximum index interval for the second matrix. The base station may receive the first portion of the payload using one or more sequences associated with the first matrix and the second portion of the payload using one or more sequences associated with the second matrix.

A method for wireless communications at a UE is described. The method may include identifying a first portion of a payload and a second portion of the payload, where the first portion of the payload is associated with a first priority and the second portion of the payload is associated with a second priority that is less than the first priority, selecting a first matrix associated with a first domain for transmitting the first portion of the payload and a second matrix associated with a second domain for transmitting the second portion of the payload based on a first maximum index interval for the first matrix being larger than a second maximum index interval for the second matrix, and transmitting the first portion of the payload using one or more sequences associated with the first matrix and the second portion of the payload using one or more sequences associated with the second matrix.

An apparatus for wireless communications at a UE is described. The apparatus may include a processor, memory in electronic communication with the processor, and instructions stored in the memory. The instructions may be executable by the processor to cause the apparatus to identify a first portion of a payload and a second portion of the payload, where the first portion of the payload is associated with a first priority and the second portion of the payload is associated with a second priority that is less than the first priority, select a first matrix associated with a first domain for transmitting the first portion of the payload and a second matrix associated with a second domain for transmitting the second portion of the payload based on a first maximum index interval for the first matrix being larger than a second maximum index interval for the second matrix, and transmit the first portion of the payload using one or more sequences associated with the first matrix and the second portion of the payload using one or more sequences associated with the second matrix.

Another apparatus for wireless communications at a UE is described. The apparatus may include means for identifying a first portion of a payload and a second portion of the payload, where the first portion of the payload is associated with a first priority and the second portion of the payload is associated with a second priority that is less than the first priority, means for selecting a first matrix associated with a first domain for transmitting the first portion of the payload and a second matrix associated with a second domain for transmitting the second portion of the payload based on a first maximum index interval for the first matrix being larger than a second maximum index interval for the second matrix, and means for transmitting the first portion of the payload using one or more sequences associated with the first matrix and the second portion of the payload using one or more sequences associated with the second matrix.

A non-transitory computer-readable medium storing code for wireless communications at a UE is described. The code may include instructions executable by a processor to identify a first portion of a payload and a second portion of the payload, where the first portion of the payload is associated with a first priority and the second portion of the payload is associated with a second priority that is less than the first priority, select a first matrix associated with a first domain for transmitting the first portion of the payload and a second matrix associated with a second domain for transmitting the second portion of the payload based on a first maximum index interval for the first matrix being larger than a second maximum index interval for the second matrix, and transmit the first portion of the payload using one or more sequences associated with the first matrix and the second portion of the payload using one or more sequences associated with the second matrix.

Some examples of the method, apparatuses, and non-transitory computer-readable medium described herein may further include operations, features, means, or instructions for receiving configuration signaling indicating a parameter for generating a set of orthogonal matrices based on the second matrix, where a size of each orthogonal matrix of the set of orthogonal matrices may be based on a value of the parameter.

Some examples of the method, apparatuses, and non-transitory computer-readable medium described herein may further include operations, features, means, or instructions for generating a first codebook associated with the first matrix, where codepoints of the first codebook may be based on the first maximum index interval, and generating a set of second codebooks based on the set of orthogonal matrices, where codepoints of the set of second codebooks may be based on a maximum index interval for each of the set of orthogonal matrices.

Some examples of the method, apparatuses, and non-transitory computer-readable medium described herein may further include operations, features, means, or instructions for transmitting a first subset of the second portion of the payload using a first sequence from a first codebook of the set of second codebooks and a second subset of the second portion of the payload using a second sequence from a second codebook of the set of second codebooks.

Some examples of the method, apparatuses, and non-transitory computer-readable medium described herein may further include operations, features, means, or instructions for transmitting the first subset of the second portion of the payload over a first frequency portion associated with a frequency hopping configuration and the second portion of the payload using a second frequency portion associated with the frequency hopping configuration, and transmitting the first portion of the payload over the first frequency portion using an encoding scheme and the first portion of the payload over the second frequency portion using the encoding scheme.

Some examples of the method, apparatuses, and non-transitory computer-readable medium described herein may further include operations, features, means, or instructions for receiving configuration signaling indicating an ordering of the first subset of the second portion of the payload and the first portion of the payload over the first frequency portion and an ordering of the second subset of the second portion of the payload and the first portion of the payload over the second frequency portion.

In some examples of the method, apparatuses, and non-transitory computer-readable medium described herein, the ordering of the first subset of the second portion of the payload and the first portion of the payload over the first frequency portion indicates that the first portion of the payload over the first frequency portion may be ordered before the first subset of the second portion of the payload, and where the ordering of the second subset of the second portion of the payload and the first portion of the payload over the second frequency portion indicates that the first portion of the payload over the second frequency portion may be ordered before the second subset of the second portion of the payload.

Some examples of the method, apparatuses, and non-transitory computer-readable medium described herein may further include operations, features, means, or instructions for generating a first joint codebook based on the first codebook associated with the first matrix and the first codebook of the set of second codebooks, where the first portion of the payload over the first frequency portion and the first subset of the second portion of the payload may be transmitted using the first joint codebook, and generating a second joint codebook based on the first codebook associated with the first matrix and the second codebook of the set of second codebooks, where the first portion of the payload over the second frequency portion and the second subset of the second portion of the payload may be transmitted using the second joint codebook.

In some examples of the method, apparatuses, and non-transitory computer-readable medium described herein, the encoding scheme may be a repetition coding scheme, a Reed-Muller encoding scheme, a polar encoding scheme, or a combination thereof.

Some examples of the method, apparatuses, and non-transitory computer-readable medium described herein may further include operations, features, means, or instructions for receiving configuration signaling indicating a mapping between the first portion of the payload and the first matrix and a mapping between the second portion of the payload and the second matrix.

In some examples of the method, apparatuses, and non-transitory computer-readable medium described herein, the first maximum index interval may be based on a size of the first matrix and a first number of bits associated with the first portion of a payload, and the second maximum index interval may be based on a size of the second matrix and a second number of bits associated with the second portion of a payload.

In some examples of the method, apparatuses, and non-transitory computer-readable medium described herein, the first portion of the payload includes feedback process information and the second portion of the payload includes channel state information.

In some examples of the method, apparatuses, and non-transitory computer-readable medium described herein, the first portion of the payload may be associated with a higher reliability requirement than the second portion of the payload.

A method for wireless communications at a base station is described. The method may include identifying a first portion of a payload and a second portion of the payload, where the first portion of the payload is associated with a first priority and the second portion of the payload is associated with a second priority that is less than the first priority, selecting a first matrix associated with a first domain for transmitting the first portion of the payload and a second matrix associated with a second domain for transmitting the second portion of the payload based on a first maximum index interval for the first matrix being larger than a second maximum index interval for the second matrix, and receiving the first portion of the payload using one or more sequences associated with the first matrix and the second portion of the payload using one or more sequences associated with the second matrix.

An apparatus for wireless communications at a base station is described. The apparatus may include a processor, memory in electronic communication with the processor, and instructions stored in the memory. The instructions may be executable by the processor to cause the apparatus to identify a first portion of a payload and a second portion of the payload, where the first portion of the payload is associated with a first priority and the second portion of the payload is associated with a second priority that is less than the first priority, select a first matrix associated with a first domain for transmitting the first portion of the payload and a second matrix associated with a second domain for transmitting the second portion of the payload based on a first maximum index interval for the first matrix being larger than a second maximum index interval for the second matrix, and receive the first portion of the payload using one or more sequences associated with the first matrix and the second portion of the payload using one or more sequences associated with the second matrix.

Another apparatus for wireless communications at a base station is described. The apparatus may include means for identifying a first portion of a payload and a second portion of the payload, where the first portion of the payload is associated with a first priority and the second portion of the payload is associated with a second priority that is less than the first priority, means for selecting a first matrix associated with a first domain for transmitting the first portion of the payload and a second matrix associated with a second domain for transmitting the second portion of the payload based on a first maximum index interval for the first matrix being larger than a second maximum index interval for the second matrix, and means for receiving the first portion of the payload using one or more sequences associated with the first matrix and the second portion of the payload using one or more sequences associated with the second matrix.

A non-transitory computer-readable medium storing code for wireless communications at a base station is described. The code may include instructions executable by a processor to identify a first portion of a payload and a second portion of the payload, where the first portion of the payload is associated with a first priority and the second portion of the payload is associated with a second priority that is less than the first priority, select a first matrix associated with a first domain for transmitting the first portion of the payload and a second matrix associated with a second domain for transmitting the second portion of the payload based on a first maximum index interval for the first matrix being larger than a second maximum index interval for the second matrix, and receive the first portion of the payload using one or more sequences associated with the first matrix and the second portion of the payload using one or more sequences associated with the second matrix.

Some examples of the method, apparatuses, and non-transitory computer-readable medium described herein may further include operations, features, means, or instructions for transmitting configuration signaling indicating a parameter for generating a set of orthogonal matrices based on the second matrix, where a size of each orthogonal matrix of the set of orthogonal matrices may be based on a value of the parameter.

Some examples of the method, apparatuses, and non-transitory computer-readable medium described herein may further include operations, features, means, or instructions for generating a first codebook associated with the first matrix, where codepoints of the first codebook may be based on the first maximum index interval, and generating a set of second codebooks based on the set of orthogonal matrices, where codepoints of the set of second codebooks may be based on a maximum index interval for each of the set of orthogonal matrices.

Some examples of the method, apparatuses, and non-transitory computer-readable medium described herein may further include operations, features, means, or instructions for receiving a first subset of the second portion of the payload using a first sequence from a first codebook of the set of second codebooks and a second subset of the second portion of the payload using a second sequence from a second codebook of the set of second codebooks.

Some examples of the method, apparatuses, and non-transitory computer-readable medium described herein may further include operations, features, means, or instructions for receiving the first subset of the second portion of the payload over a first frequency portion associated with a frequency hopping configuration and the second portion of the payload using a second frequency portion associated with the frequency hopping configuration, and receiving the first portion of the payload over the first frequency portion using an encoding scheme and the first portion of the payload over the second frequency portion using the encoding scheme.

Some examples of the method, apparatuses, and non-transitory computer-readable medium described herein may further include operations, features, means, or instructions for transmitting configuration signaling indicating an ordering of the first subset of the second portion of the payload and the first portion of the payload over the first frequency portion and an ordering of the second subset of the second portion of the payload and the first portion of the payload over the second frequency portion.

In some examples of the method, apparatuses, and non-transitory computer-readable medium described herein, the ordering of the first subset of the second portion of the payload and the first portion of the payload over the first frequency portion indicates that the first portion of the payload over the first frequency portion may be ordered before the first subset of the second portion of the payload, and where the ordering of the second subset of the second portion of the payload and the first portion of the payload over the second frequency portion indicates that the first portion of the payload over the second frequency portion may be ordered before the second subset of the second portion of the payload.

Some examples of the method, apparatuses, and non-transitory computer-readable medium described herein may further include operations, features, means, or instructions for generating a first joint codebook based on the first codebook associated with the first matrix and the first codebook of the set of second codebooks, where the first the first portion of the payload over the first frequency portion and the first subset of the second portion of the payload may be received using the first joint codebook, and generating a second joint codebook based on the first codebook associated with the first matrix and the second codebook of the set of second codebooks, where the first portion of the payload over the second frequency portion and the second subset of the second portion of the payload may be received using the second joint codebook.

In some examples of the method, apparatuses, and non-transitory computer-readable medium described herein, the encoding scheme may be a repetition coding scheme, a Reed-Muller encoding scheme, a polar encoding scheme, or a combination thereof.

Some examples of the method, apparatuses, and non-transitory computer-readable medium described herein may further include operations, features, means, or instructions for transmitting configuration signaling indicating a mapping between the first portion of the payload and the first matrix and a mapping between the second portion of the payload and the second matrix.

In some examples of the method, apparatuses, and non-transitory computer-readable medium described herein, the first maximum index interval may be based on a size of the first matrix and a first number of bits associated with the first portion of a payload, and the second maximum index interval may be based on a size of the second matrix and a second number of bits associated with the second portion of a payload.

In some examples of the method, apparatuses, and non-transitory computer-readable medium described herein, the first portion of the payload includes feedback process information and the second portion of the payload includes channel state information.

In some examples of the method, apparatuses, and non-transitory computer-readable medium described herein, the first portion of the payload may be associated with a higher reliability requirement than the second portion of the payload.

DETAILED DESCRIPTION

Figure 1:
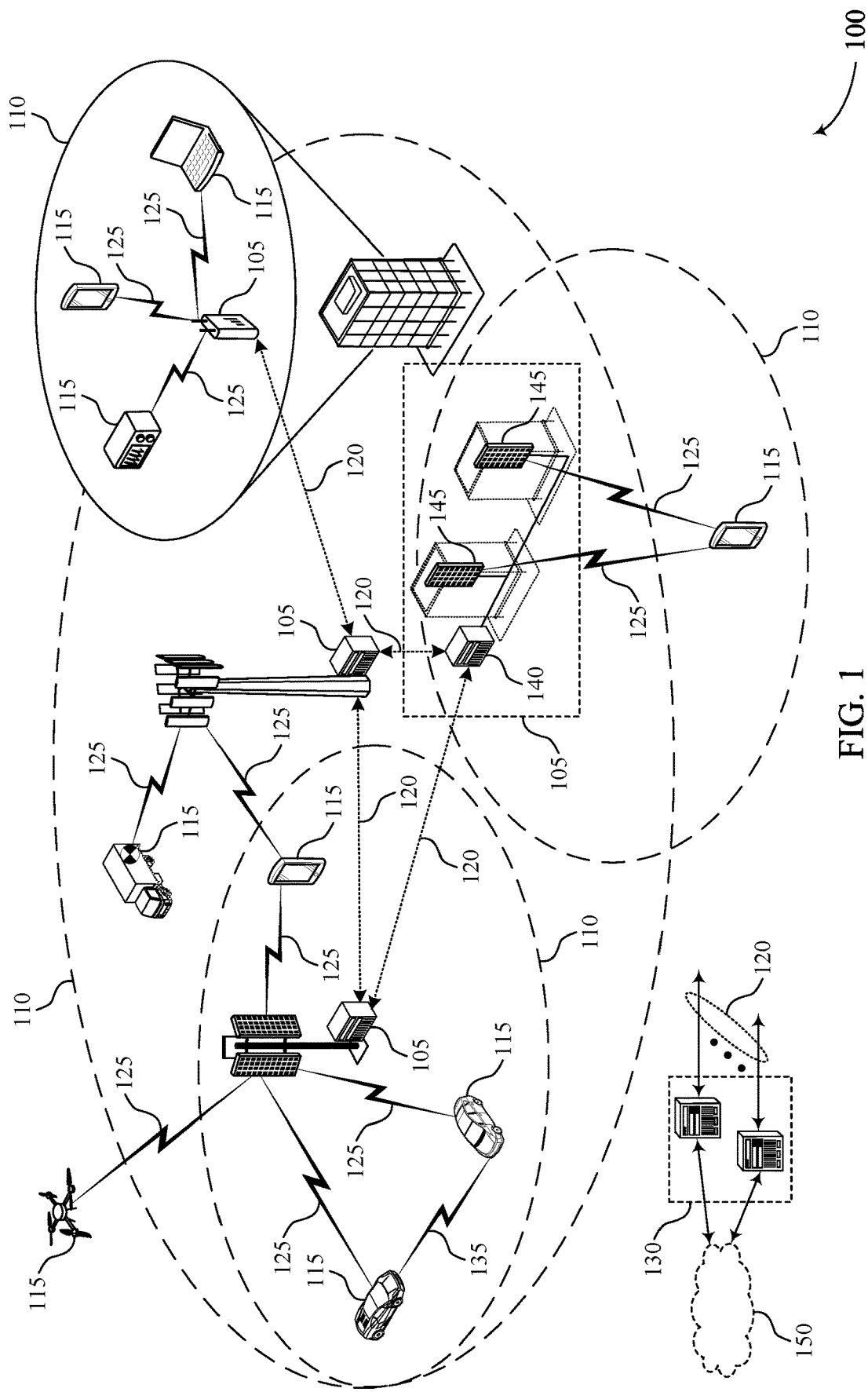
FIG. 1 illustrates an example of a system for wireless communications that supports payload multiplexing with orthogonal sequences in accordance with aspects of the present disclosure.

Wireless communications systems may support communications between a user equipment (UE) and a base station. The UE and the base station may communicate over a channel allocated for communication between the UE and the base station. In some cases, the UE and the base station may transmit signals including a payload, such as a number of bits of information, to each other over the allocated resources in the channel. For example, the UE may transmit, to the base station, the payload of the signal according to a selected sequence (or codepoint) associated with the allocated resources. In some cases, the UE may use a non-orthogonal sequence to convey the payload. In some systems, however, such as fifth generation (5G) New Radio (NR) systems, the use of non-orthogonal sequences may fail to provide reliable and low-latency communication. For example, the UE, using non-orthogonal sequences for payload transmissions, may fail to meet reliability and low-latency constraints associated with communications over high-frequency radio frequency bands (e.g., frequency range two (FR2) radio frequency bands).

In some examples, the UE or the base station, or both, may generate a set of orthogonal sequences for conveying a payload from the UE to the base station. For example, the UE or the base station, or both, may generate the set of orthogonal sequences based on a product (e.g., a Kronecker product) of an orthogonal matrix and a cell-specific base sequence. In some implementations, the orthogonal matrix may be a square matrix having a size corresponding to a number of orthogonal frequency division multiplexing (OFDM) symbols (e.g., time periods) in a resource allocation over which the UE is configured to transmit the payload. The cell-specific base sequence may be a vector having a size corresponding to a number of frequency tones, or subcarriers, in the resource allocation over which the UE is configured to transmit the payload. The product of the orthogonal matrix and the cell-specific base sequence may generate the set of orthogonal sequences and each orthogonal sequence may have a length corresponding to the number of OFDM symbols multiplied by the number of frequency tones in the resource allocation. In some aspects, the set of orthogonal sequences may be orthogonal in the time-domain and the frequency-domain.

The UE or the base station, or both, may determine a subset of the set of orthogonal sequences, and the UE may store the subset of orthogonal sequences in a constructed codebook. In some implementations, the subset of orthogonal sequences may be based on the number of bits included in the payload, and each orthogonal sequence of the subset of orthogonal sequences may be associated with an index in the constructed codebook. In some examples, the UE may select an orthogonal sequence from the constructed codebook including the subset of orthogonal sequences based on the bits of the payload. For example, the UE may determine a bit stream of the payload and may convert the bit stream into a decimal number. The decimal number may correspond to an index in the constructed codebook and, as such, the UE may select the orthogonal sequence from the constructed codebook that is associated with the index corresponding to the decimal number.

In some aspects, the number of bits may convey uplink control information (UCI) of two types. For instance, a first subset of the number of bits of a UCI message may convey hybrid automatic repeat request (HARQ) acknowledgments (ACKs) and a second subset of the number of bits may convey channel state information (CSI). In such cases, the UE or the base station may construct the codebook by mapping a first of the two UCI types to a first matrix from a first domain (e.g., a discrete Fourier transform (DFT) domain spanning the total number of row or column indices in the orthogonal matrix) and mapping a second of the two UCI types to a second matrix from a second domain (e.g., a cyclic shift (CS) domain spanning indices representing the total number of ways that the cell-specific base sequence may be shifted cyclically). The UE or the base station may select a first set of indices from the DFT domain to represent each possible value of the bits of the payload conveying the UCI of the first type and may select a second set of indices from the CS domain to represent each possible value of the bits of the payload conveying the UCI of the second type. For instance, if the payload includes X bits of the first UCI type and Y bits of the second UCI type, the UE or the base station may select $2^X$ DFT indices and $2^Y$ CS indices. Each entry in the codebook may correspond to a unique pairing of a DFT index with a CS index. Thus, when the UE or the base station selects an orthogonal sequence from the codebook, the UE or the base station may be capable of determining the corresponding DFT index and CS index and, thus, may determine a value for the UCI mapped to the respective DFT index and a value for the UCI mapped to the respective CS index.

In some examples, the UE or the base station may determine which UCI type to map to a domain based on a priority of each UCI type and a maximum index interval of each domain. A maximum index interval may correspond to a maximum possible interval between indices in a domain (e.g., indices of a matrix for that domain) given the number of indices to select from that domain. If a first UCI type or portion (e.g., HARQ-ACK) has a greater priority than a second UCI type or portion (e.g., CSI), and if the maximum index interval of the DFT domain is greater than the maximum index interval of the CS domain, the first UCI type may map to the DFT domain and the second UCI type may map to the CS domain. Alternatively, if the maximum index interval of the CS domain is greater than the maximum index interval of the DFT domain, the first UCI type may map to the CS domain and the second UCI type may map to the DFT domain. Mapping the higher priority UCI type to the domain that has a higher maximum index interval may enable a base station to have a higher likelihood of successfully recovering the bits from the domain that has the higher maximum index interval compared to the domain that has the lower maximum index interval.

In some examples, the UE or base station, or both, may break apart an orthogonal matrix into a set of smaller block matrices. For example, the base station may configure the UE with a parameter for generating the set of smaller block matrices (e.g., a set of first orthogonal matrices) that are based, at least in some aspects, on the original orthogonal matrix (e.g., a second orthogonal matrix). The UE or the base station may construct a codebook for each block matrix in the set of block matrices. When breaking apart the original orthogonal matrix, the maximum index interval in the DFT domain associated with each block matrix may be smaller as compared to the original orthogonal matrix. Thus, even if the DFT domain of the original orthogonal matrix has a higher maximum index interval than the CS domain, if the DFT domain of the block matrix has a lower maximum index interval than the CS domain, the UE or the base station may map the higher priority UCI to the CS domain.

Similarly, the UE or base station, or both, may break apart a cell-specific base sequence into a set of smaller block base sequences. For example, the base station may configure the UE with a parameter for generating the set of smaller block base sequences (e.g., a set of first base sequences) that are based, at least in some aspects, on the original base sequence (e.g., a second base sequence). The UE or the base station may construct a codebook for each base sequence in the set of base sequences. When breaking apart the original base sequence, the maximum index interval in the CS domain associated with each block base sequence may be smaller as compared to the original base sequence. Thus, even if the CS domain of the original base sequence has a higher maximum index interval than the DFT domain, if the CS domain of the block base sequence has a lower maximum index interval than the DFT domain, the UE or the base station may map the higher priority UCI to the DFT domain.

Particular aspects of the subject matter described herein may be implemented to realize one or more potential advantages. For instance, mapping the higher priority UCI type to the domain that has a higher maximum index interval may enable a base station to have a higher likelihood of successfully recovering the bits conveying the UCI as compared to a case where the higher priority UCI type was mapped to the domain that has the lower maximum index interval. Additionally, breaking apart the codebook into smaller codebooks (e.g., by breaking apart the corresponding orthogonal matrix or cell-specific base sequence) may enable transmission of more bits in payload for orthogonal sequence based uplink control channel transmissions.

Aspects of the disclosure are initially described in the context of wireless communications systems. Additional aspects of the disclosure are described in the context of an additional wireless communications system, an orthogonal matrix, a base sequence, a mathematical operation, sets of indices, matrix configurations, and a process flow. Aspects of the disclosure are further illustrated by and described with reference to apparatus diagrams, system diagrams, and flowcharts that relate to payload multiplexing with orthogonal sequences.

FIG. 1 illustrates an example of a wireless communications system 100 that supports payload multiplexing with orthogonal sequences in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

In some implementations of the present disclosure, the UE 115 may transmit a signal including a payload (e.g., a multi-bit payload) to a base station 105 using an orthogonal sequence. In some examples, the UE 115 may generate or be configured with a set of orthogonal sequences, which may be equivalently referred to as a set of orthogonal codepoints. In some aspects, the orthogonal sequences may be orthogonal in both time and frequency.

The number of orthogonal sequences in the set of orthogonal sequences may be based on a number of time periods, such as OFDM symbols, and a number of frequency tones, such as a number of subcarriers, that are allocated for transmitting the payload of the signal. For instance, the UE may determine a resource allocation of N OFDM symbols and M frequency tones and may accordingly determine N*M orthogonal sequences. The UE 115 may select a subset of the set of orthogonal sequences based on the size of the payload (e.g., the number of bits in the payload). For example, the UE 115 may identify that the payload includes a number of bits and may select a number of orthogonal sequences from the set of orthogonal sequences based on the number of bits. In some other examples, the base station 105 may similarly generate a set of orthogonal sequences and determine a subset of orthogonal sequences based on the number of bits in the payload. In some aspects, the UE 115 or the base station 105, or both, may construct a codebook including the subset of orthogonal sequences. In the case that the codebook is constructed by the base station 105, the base station 105 may signal the constructed codebook to the UE 115.

In some examples, the UE 115 may select an orthogonal sequence from the subset of orthogonal sequences based on a bit stream of the payload. For example, the UE 115 may determine that the payload is associated with a bit stream (e.g., successive values of a number of bits) and may determine a value corresponding to the bit stream based on a mapping. The UE 115 may use the value to select an orthogonal sequence from the subset of orthogonal sequences based on the indices of the subset of orthogonal sequences in the constructed codebook. For instance, the UE 115 may select an orthogonal sequence from the constructed codebook based on identifying an index associated with each of the orthogonal sequences in the codebook and mapping (i.e., matching) the value determined based on the bit stream to an index in the codebook. As such, the UE 115 may select the orthogonal sequence associated with the index value that maps to the bit stream of the payload and, as such, may transmit the payload including the number of bits using the selected orthogonal sequence.

Generally, the described techniques provide for a UE 115 or a base station 105 to select matrices for different portions of a payload according to a priority of the uplink control information that each portion corresponds to and a maximum index interval associated with each matrix. For instance, the UE 115 may identify a first portion of a payload and a second portion of the payload, where the first portion of the payload is associated with a first priority and the second portion of the payload is associated with a second priority that is less than the first priority. The UE 115 may select a first matrix associated with a first domain (e.g., a DFT domain) for transmitting the first portion of the payload and a second matrix associated with a second domain (e.g., a CS domain) for transmitting the second portion of the payload based on a first maximum index interval for the first matrix being larger than a second maximum index interval for the second matrix. The UE 115 may transmit the first portion of the payload using one or more sequences associated with the first matrix and the second portion of the payload using one or more sequences associated with the second matrix.

Additionally or alternatively, a base station 105 may identify a first portion of a payload and a second portion of the payload, where the first portion of the payload is associated with a first priority and the second portion of the payload is associated with a second priority less than the first priority. The base station 105 may select a first matrix associated with a first domain for transmitting the first portion of the payload and a second matrix associated with a second domain for transmitting the second portion of the payload based on a first maximum index interval for the first matrix being larger than a second maximum index interval for the second matrix. The base station 105 may receive the first portion of the payload using one or more sequences associated with the first matrix and the second portion of the payload using one or more sequences associated with the second matrix.

Figure 2:
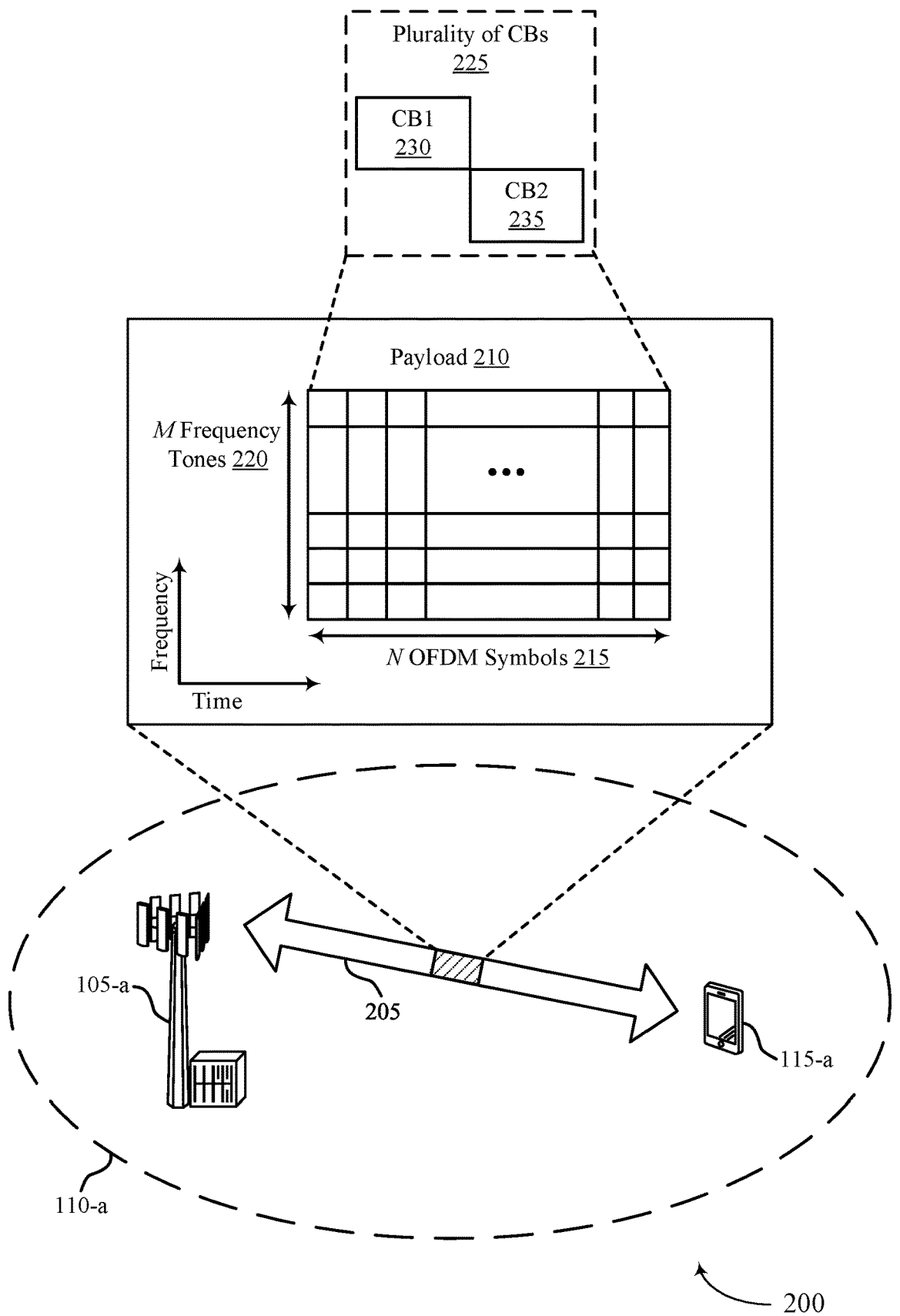
FIG. 2 illustrates an example of a wireless communications system that supports payload multiplexing with orthogonal sequences in accordance with aspects of the present disclosure.

FIG. 2 illustrates an example of a wireless communications system 200 that supports payload multiplexing with orthogonal sequences in accordance with aspects of the present disclosure. In some examples, wireless communications system 200 may implement aspects of wireless communications system 100. The wireless communications system 200 may include a UE 115-*a* and a base station 105-*a*, which may be examples of corresponding devices as described herein. The UE 115-*a* and the base station 105-*a* may communicate via a communication link 205 within a geographic coverage area 110-*a*. In some examples, the UE 115 may transmit a signal including a payload 210 to the base station 105-*a* via the communication link 205. The payload 210 may occupy a resource allocation of N OFDM symbols 215 and M frequency tones 220 and the UE 115-*a* may convey the payload 210 using a sequence based on the N OFDM symbols 215 and the M frequency tones 220. In some aspects, UE 115-*a* may break apart the orthogonal matrix/codebook into smaller orthogonal matrices/codebooks, such as a first codebook 230 and a second codebook 235, for transmitting the payload 210.

As described herein, N may correspond to any number, but may sometimes be defined within the range of 1 to 14. Similarly, M may correspond to any number, but may sometimes be defined within the range of 1 to 12. In some cases, such as when N=14 and M=12, the resource allocation may be a resource block. Further, as described herein, the payload 210 may be an example of any signal including information (e.g., a number of bits) and, although described in the context of transmission from the UE 115-*a*, may be transmitted by either the UE 115-*a* or the base station 105-*a*. In some examples, the payload 210 may be an example of uplink control information and, accordingly, the UE 115-*a* may transmit the payload 210 in a resource allocation of a physical uplink control channel (PUCCH). In such examples, the N OFDM symbols 215 and the M frequency tones 220 may correspond to a time and frequency resource grid assigned to the PUCCH for the UE 115-*a* to transmit the payload 210.

In some cases, the wireless communications system 200 may be associated with some latency and reliability conditions or constraints that support communications between the UE 115-*a* and the base station 105-*a*. For example, in some cases, the wireless communications system 200 may support communications between the UE 115-*a* and the base station 105-*a* based on maintaining low-latency and highly-reliable transmissions between the UE 115-*a* and the base station 105-*a*. Such low-latency and high-reliability conditions may be further tightened for communications in high-frequency radio frequency bands, such as communications in a frequency range two (FR2) radio frequency band (e.g., a millimeter wave (mmW) radio frequency band). In some cases, the UE 115-*a* may use a non-orthogonal sequence (or codepoint) to convey the payload 210. For example, the UE 115-*a* may generate or be configured with a codebook of non-orthogonal sequences and the UE 115-*a* may select a non-orthogonal sequence from the codebook to convey the payload 210. In some circumstances, however, such use of non-orthogonal sequences may fail to meet the latency or reliability constraints of the wireless communications system 200, which may decrease the likelihood for successful communications between the UE 115-*a* and the base station 105-*a*.

In some implementations of the present disclosure, the UE 115-*a* or the base station 105-*a*, or both, may identify a set of orthogonal sequences from which the UE 115-*a* may select a sequence for conveying the payload 210. In some cases, such use of orthogonal sequences to convey the payload 210 may provide for low-latency and reliable communications with the base station 105-*a*. Accordingly, the wireless communications system 200, based on supporting orthogonal sequences for conveying a payload 210, may increase the likelihood for successful communications between the UE 115-*a* and the base station 105-*a*.

In some examples, the UE 115-*a* or the base station 105-*a*, or both, may generate a number of orthogonal sequences based on the resources allocated for the payload 210. For example, the UE 115-*a* and the base station 105-*a* may communicate via a resource allocation of a communication channel and the UE 115-*a* or the base station 105-*a*, or both, may generate a number of orthogonal sequences based on the resource allocation. For instance, the base station 105-*a* may allocate N OFDM symbols 215 and M frequency tones 220 for transmission of the payload 210 and, accordingly, the UE 115-*a* or the base station 105-*a*, or both, may generate a number of orthogonal sequences equal to N*M. In some aspects, each orthogonal sequence of the set of orthogonal sequences may have a length equal to the size of the resource allocation (e.g., the number of resource elements in the resource allocation, or N*M), such that each orthogonal sequence may convey the payload 210 across the resource allocation. As such, the UE 115-*a* or the base station 105-*a*, or both, may generate a set of N*M orthogonal sequences and each orthogonal sequence may be associated with a length of N*M. The generation of the set of orthogonal sequences is described in more detail with reference to FIGS. 3A and 3B.

The UE 115-*a* or the base station 105-*a*, or both, may determine a subset of the set of orthogonal sequences based on the payload 210. For example, the UE 115-*a* or the base station 105-*a*, or both, may determine a size of the payload 210 (e.g., a number of bits included in the payload 210) and may determine a subset of the set of orthogonal sequences based on the size of the payload 210. For instance, the payload 210 may include a number of bits equal to K and, accordingly, the number of orthogonal sequences within the determined subset of orthogonal sequences may be based on the value of K. In some implementations, for example, the UE 115-*a* or the base station 105-*a*, or both, may select a number of orthogonal sequences equal to $2^K$ based on identifying that the payload 210 includes K bits. In some cases, the UE 115-*a* or the base station 105-*a*, or both, may select $2^K$ orthogonal sequences because $2^K$ orthogonal sequences may provide one orthogonal sequence for each possible value (i.e., permutation) of K bits.

As such, the UE 115-*a* or the base station 105-*a*, or both, may identify a subset of orthogonal sequences (e.g., a subset of $2^K$ orthogonal sequences) from which the UE 115-*a* may select an orthogonal sequence to convey the payload 210. In the case that the base station 105-*a* generates the set of orthogonal sequences and determines the subset of orthogonal sequences, the base station 105-*a* may signal an indication of the subset of orthogonal sequences to the UE 115-*a* and the UE 115-*a* may construct a codebook including the indicated subset of orthogonal sequences. Alternatively, in the case that the UE 115-*a*, or both the UE 115-*a* and the base station 105-*a*, generates the set of orthogonal sequences and selects the subset of orthogonal sequences from the set of orthogonal sequences, the UE 115-*a* may construct a codebook including the subset of orthogonal sequences without additional signaling from the base station 105-*a*. In some aspects, the UE 115-*a* may construct the codebook such that each orthogonal sequence of the subset of orthogonal sequences in the codebook is associated with an index in the codebook.

The UE 115-*a* may select an orthogonal sequence from the subset of orthogonal sequences (e.g., from the constructed codebook) to convey the payload 210 based on the bits in the payload 210. For example, the UE 115-*a* may identify a bit stream (e.g., successive values of a number of bits) of the payload 210 and may select an orthogonal sequence from the codebook based on the bit stream. The bit stream may be represented as $b_0, b_1, b_2, \ldots, b_{K-1}$, where b corresponds to a value of a bit and K is equal to the number of bits in the payload 210. In some implementations, the UE 115-*a* may convert the bit stream to a number (e.g., a decimal number), such as k, that may correspond to an orthogonal sequence of the subset of orthogonal sequences. For example, k may correspond to or map to an index in the codebook of the subset of orthogonal sequences. As such, the UE 115-*a* may convert the bit stream of the payload 210 into the value k and may determine which orthogonal sequence of the subset of orthogonal sequences corresponds to the index value of k (e.g., the UE 115-*a* may determine the $k^{th}$ sequence in the constructed codebook). Accordingly, the UE 115-*a* may select the orthogonal sequence corresponding to the index value of k and may transmit the payload 210 using the selected orthogonal sequence.

The UE 115-*a*, implementing the described techniques, may efficiently construct a codebook of orthogonal sequences and select one of the orthogonal sequences to convey the payload 210 based on the number of bits in the payload 210, which may increase the likelihood that the base station 105-*a* is able to successfully receive the payload 210 while avoiding unnecessary storage costs associated with storing the full set of generated orthogonal sequences. Moreover, the described techniques may support and maintain a low peak-to-average power ratio (PAPR) associated with the transmission of the payload 210, which may enable to the UE 115-*a* to more use a greater transmit power when transmitting the payload 210.

In some aspects, the number of bits in the payload 210 may convey uplink control information (UCI) of two types. For instance, a first subset of the number of bits may convey HARQ-ACKs and a second subset of the number of bits may convey CSI. In such cases, the UE 115-*a* or the base station 105-*a* may construct the codebook by mapping a first of the two UCI types to a DFT domain (e.g., the domain spanning the total number of row or column indices in the orthogonal matrix) and mapping a second of the two UCI types to a CS domain (e.g., the domain spanning indices representing the total number of ways that the cell-specific base sequence may be shifted cyclically). Additional details about the DFT domain and the CS domain may be described elsewhere herein, for instance, with reference to FIG. 4. The UE 115-*a* or the base station 105-*a* may select a first set of indices from the DFT domain to represent each possible value of the bits of the payload conveying the UCI of the first type and may select a second set of indices from the CS domain to represent each possible value of the bits of the payload conveying the UCI of the second type. For instance, if the payload includes X bits of the first UCI type and Y bits of the second UCI type, the UE 115-*a* or the base station 105-*a* may select $2^X$ DFT indices and $2^Y$ CS indices. Each entry in the codebook may correspond to a unique pairing of a DFT index with a CS index. Thus, when the UE 115-*a* or the base station 105-*a* selects an orthogonal sequence from the codebook, the UE 115-*a* or the base station 105-*a* may be capable of determining the corresponding DFT index and CS index and, thus, may determine a value for the UCI mapped to the respective DFT index and a value for the UCI mapped to the respective CS index.

In some examples, the UE 115-*a* or the base station 105-*a* may determine which UCI type to map to a domain based on a priority of each UCI type and a maximum index interval of each domain. A maximum index interval may correspond to a maximum possible interval between indices in a domain. If a first UCI type (e.g., HARQ-ACK) has a greater priority than a second UCI type (e.g., CSI) and the maximum index interval of the DFT domain is greater than the maximum index interval of the CS domain, the first UCI type may map to the DFT domain and the second UCI type may map to the CS domain. Alternatively, if the maximum index interval of the CS domain is greater than the maximum index interval of the DFT domain, the first UCI type may map to the CS domain and the second UCI type may map to the DFT domain. Mapping the higher priority UCI type to the domain that has a higher maximum index interval enable the base station 105-*a* to have a higher likelihood of successfully recovering the bits from the domain that has the higher maximum index interval compared to the domain that has the lower maximum index interval. Alternatively, the base station 105-*a* may transmit signaling indicating a mapping between the first and second UCI types and the corresponding domains.

Although the described techniques may be beneficial in many ways, in some aspects these techniques may limit the number of bits that may be conveyed in a payload 210. To increase the number of bits that may be conveyed, the UE 115-*a* or the base station 105-*a* may use a decomposed domain to transmit low priority UCI and may use a non-decomposed domain to for high priority UCI. For instance, the UE 115-*a* or the base station 105-*a* may pick a first domain (e.g., the DFT domain) and may decompose or break apart the corresponding codebook into a set of codebooks 225. In one example, if picking the DFT domain, the UE 115-*a* or the base station 105-*a* may break the orthogonal matrix into smaller orthogonal matrices (i.e., block matrices). The UE 115-*a* or the base station 105-*a* may generate a first codebook based on a first block matrix and the original, non-decomposed cell-specific base sequence and may generate a second codebook based on a second block matrix and the original, non-decomposed cell-specific base sequence. In another example, if picking the CS domain, the UE 115-*a* or the base station 105-*a* may break the cell-specific base sequence into smaller cell-specific base sequences (i.e., block base sequences). The UE 115-*a* or base station 105-*a* may generate a first codebook based on a first block base sequence and the original, non-decomposed orthogonal matrix and may generate a second codebook based on a second block base sequence and the original, non-decomposed orthogonal matrix. In some examples, the original orthogonal matrix or the original cell-specific base sequence or a combination thereof may be the biggest possible size according to the dimensions of their respective domains (e.g., DFT domain for the orthogonal matrix and CS domain for the cell-specific base sequence).

In some examples, the base station 105-*a* may transmit configuration signaling indicating a parameter L for generating a set of orthogonal matrices or a set of base sequences. L may represent a total number of orthogonal matrices or base sequences to generate. The first orthogonal matrices may be based on DFT=(N/L)*CS (M). A first codebook 230 generated using L may span M frequency tones in the frequency domain (e.g., the DFT domain) and N/2 OFDM symbols in the time domain (e.g., the CS domain). Similarly, a second codebook 235 may span M frequency tones in the frequency domain (e.g., the DFT domain) and N/2 OFDM symbols in the time domain (e.g., the CS domain). The M frequency tones of the first codebook 230 may include or span the same or a different number of tones as the M frequency tones of the second codebook 235. It is to be understood that the N/2 OFDM symbols of the first codebook 230 may include or span the same or a different number of symbols as the N/2 OFDM symbols of the second codebook 235. That is, the size of each orthogonal matrix may be based on a division of the size of the second orthogonal matrix.

The plurality of first orthogonal matrices may be based on a second orthogonal matrix (e.g., as discussed above and based on DFT(N)*CS(M)) where a size of the second orthogonal matrix is based on the number of N OFDM symbols 215 and M frequency tones 220 configured for conveying payload 210. The UE 115-*a* or base station 105-*a*, or both, may generate a set of codebooks 225 corresponding to the plurality of first orthogonal matrices, such as the first codebook 230 and the second codebook 235. The UE 115-*a* may transmit (and the base station 105-*a* may receive) a first portion of payload 210 using a first sequence from the first codebook 230 of the set of codebooks 225 and a second portion of the payload 210 using the second codebook 235 of the set of codebooks 225. That is, the UE 115-*a* may select a first sequence from the first codebook 230 to use for transmission of the first portion of the payload 210 and select a second sequence from the second codebook 235 to use for transmission of the second portion of the payload 210.

In some examples, how the UE 115-*a* or the base station 105-*a* maps a UCI type to a domain may change after performing decomposition. For instance, when breaking apart the original orthogonal matrix, the maximum index interval in the DFT domain associated with each block matrix may be smaller as compared to the original orthogonal matrix. Thus, even if the DFT domain of the original orthogonal matrix has a higher maximum index interval than the CS domain, if the DFT domain of the block matrix has a lower maximum index interval than the CS domain, the UE 115-*a* or the base station 105-*a* may map the higher priority UCI to the CS domain. When breaking apart the original base sequence, the maximum index interval in the CS domain associated with each block base sequence may be smaller as compared to the original base sequence. Thus, even if the CS domain of the original base sequence has a higher maximum index interval than the DFT domain, if the CS domain of the block base sequence has a lower maximum index interval than the DFT domain, the UE or the base station may map the higher priority UCI to the DFT domain.

In some examples, each block of the decomposed domain may be used to carry a subset of the UCI to which the domain is mapped (e.g., CSI). For instance, if the UE 115-*a* or the base station 105-*a* breaks apart the orthogonal matrix into two orthogonal matrices a first codebook (e.g., codebook 230) corresponding to the first orthogonal matrix may convey a first subset of bits of the UCI and a second codebook (e.g., 235) corresponding to the second orthogonal matrix may convey a second subset of bits of the UCI. In some examples, the UE 115-*a* may transmit encoded bits across the blocks of the decomposed domain for the UCI mapped to the non-decomposed domain (e.g., HARQ-ACKs). For instance, the UE 115-a may transmit a first set of encoded bits for the non-decomposed domain UCI using the first codebook and a second set of encoded bits for the non-decomposed domain UCI using the second codebook. Examples of encoding performed may include repetition encoding, simplex encoding, Reed-Muller encoding, or polar encoding or any other form of coding suitable for wireless communications. Additional details about using decomposed and non-decomposed domains in this fashion may be described elsewhere herein, for example, with reference to FIGS. 5 and 6.

In some examples, the base station 105-a may transmit, for the first codebook 230, configuration signaling indicating an ordering of the first subset of bits for the UCI mapped to the decomposed domain and the bits for the UCI mapped to the non-decomposed domain. For instance, the configuration signaling may indicate that the bits for the UCI mapped to the non-decomposed domain are before the first subset of bits for the UCI mapped to the decomposed domain. Similarly, the base station 105-a may transmit, for the second codebook 235, configuration signaling indicating an ordering of the second subset of bits for the UCI mapped to the decomposed domain and the bits for the UCI mapped to the non-decomposed domain. For instance, the configuration signaling may indicate that the bits for the UCI mapped to the non-decomposed domain are before the second subset of bits for the UCI mapped to the decomposed domain. In some examples, in addition or alternative to the configuration signaling, the configuration regarding the ordering of bits described herein may be a static or semi-static configuration.

Figure 3A:
FIG. 3A illustrates an example of an orthogonal matrix and a base sequence that supports payload multiplexing with orthogonal sequences in accordance with aspects of the present disclosure.
Figure 3A:

FIG. 3A illustrates an example of an orthogonal matrix 300 and a base sequence 301 that supports payload multiplexing with orthogonal sequences in accordance with aspects of the present disclosure. In some examples, orthogonal matrix 300 and the base sequence 301 may be implemented by aspects of wireless communications system 100. For example, a UE 115 or a base station 105, or both, may use the orthogonal matrix 300 and the base sequence 301 to generate a set of orthogonal sequences from which the UE 115-a may select an orthogonal sequence to convey a payload to the base station 105. The UE 115 and the base station 105 may be examples of corresponding devices as described herein.

The orthogonal matrix 300, which may be referred to as W, may be an orthogonal, square matrix of size N (i.e., an N×N matrix). In some implementations, N may be equal to the number of symbols of a resource allocation associated with transmission of the payload, as described in more detail with reference to FIG. 2. Further, in some specific examples, the orthogonal matrix 300 may be a DFT matrix and, as such, may be equivalently referred to as a DFT matrix. Accordingly, a row or a column of the orthogonal matrix 300 (e.g., a vector) may be referred to as either $\vec{w}(n)$ or $\overrightarrow{DFT}(n)$, where n is an index of the row or the column of the orthogonal matrix 300 (e.g., the $n^{th}$ row or column). Although FIG. 3A illustrates n=1, n may be equal to any number n=0, 1, 2, ..., N−1. A row of the orthogonal matrix 300 is defined by Equation 1, shown below.

$$\overrightarrow{DFT}(n) = [\omega^{0n}, \omega^{1n}, \omega^{2n}, \ldots \omega^{in}, \ldots, \omega^{(N-1)n}] \quad (1)$$

The corresponding column of the orthogonal matrix 300 may be equal to $\overrightarrow{DFT}(n)^T$. In Equation 1, $\omega$ may be defined as either $\omega = e^{-j2\pi/N}$ or $\omega = e^{j2\pi/N}$. Each column of the vector $\overrightarrow{DFT}(n)$ (or each row of the vector $\overrightarrow{DFT}(n)^T$) may correspond to an OFDM symbol index i, where i=0 in the first column (i.e., the left-most column) of the orthogonal matrix 300 and increments by one to i=N−1 in the last column (i.e., the right-most column) of the orthogonal matrix 300. In some cases, an OFDM symbol index i may correspond to an OFDM symbol of the resource allocation that the UE 115 may use to transmit the payload. In some cases, the phase ramp of a row or a column of the orthogonal matrix 300 may be defined as i*n, where i is the OFDM symbol index and n may describe the slope of the phase change. As such, a column or a row of the orthogonal matrix 300 may include entries for each OFDM symbol of the resource allocation in one frequency tone.

The base sequence 301, which may be equivalently referred to as a base sequence $\vec{S}(m)$, may be a cyclically shifted frequency-domain base sequence. In other words, the base sequence 301 may be a frequency-domain base sequence S associated with a cyclic shift in the time-domain. As such, the base sequence S may be based on a cyclic shift index m, where m=0, 1, 2, ..., M−1. In some aspects, M may be equal to the number of frequency tones of a resource allocation associated with the transmission of the payload, as described in more detail with reference to FIG. 2. Equivalently, the base sequence S may be associated with a phase ramp vector in the frequency domain, such as $e^{-j2\pi im/M}$ or $e^{j2\pi im/M}$, and the phase ramp vector and the base sequence S may be multiplied together to determine the base sequence $\vec{S}(m)$, as shown by base sequence 301.

For example, the UE 115 or the base station 105, or both, may take a DFT or a fast Fourier transform (FFT) of the base sequence S in the frequency-domain to convert the base sequence S to the time-domain, where the time-domain representation of the base sequence S, which may be referred to as $\tilde{S}$, has a length M. The UE 115 or the base station 105, or both, may apply a cyclic shift index m to $\tilde{S}$ to shift $\tilde{S}$ by index m, which may effectively move the entries of $\tilde{S}$ forward or backward by m in a cyclic fashion. The time-domain cyclic shift may correspond to the frequency-domain phase ramp vector $e^{-j2\pi im/M}$ or $e^{j2\pi im}/M$. The index m of the phase ramp may correspond to a slope of the phase ramp (e.g., the phase ramp may be defined as m/M) and the index l may correspond to a tone index of the resource allocation. As shown in base sequence 301, S(0), S(1), S(2), ..., S(l), ..., S(M−1) may correspond to entries of the base sequence S for each frequency tone l=0, 1, 2, ..., M−1. Accordingly, the base sequence 301 may include entries for each frequency tone of the resource allocation in one OFDM symbol.

In some cases, the base sequence 301 may be a cell-specific base sequence, such that each UE 115 within a cell of the base station 105 (e.g., within a geographic coverage area of the base station 105) may use the same base sequence 301. Further, in some cases, the base sequence 301 may have a low PAPR property and may be referred to as a low PAPR sequence. In some cases, a cyclic shift in the time-domain and a phase ramp in the frequency domain may avoid affecting the PAPR of the base sequence, thus maintaining the PAPR associated with the base sequence 301.

As illustrated in FIG. 3A, the base sequence 301 may be a vector of size M×1. Additionally, or alternatively, there may be a number of base sequences 301 equal to the number of cyclic shift indices associated with the base sequence 301. For instance, there may be M base sequences 301 (i.e., one base sequence $\vec{S}(m)$ for each of m=0, 1, 2, ..., M−1). Further, each row of the base sequence 301 may correspond to a frequency tone index l, where l=0 in the first row (i.e., the bottom row) and increments by one to l=M−1 in the last column (i.e., the top row). As such, each frequency tone index l may correspond to a frequency tone of the resource allocation associated with the transmission of the payload. Accordingly, a number of base sequences 301 (e.g., a number equal to M) may be considered, and the number of base sequences 301 may be visualized as a matrix of base sequences $\vec{S}(m)$ of dimensions M×M (e.g., M cyclic shifts×M frequency tones).

As described herein, the UE 115 or the base station 105, or both, may generate a set of orthogonal sequences. In some examples, the UE 115 or the base station 105, or both, may generate a number of orthogonal sequences based on a product, such as a Kronecker product, of the orthogonal matrix 300 and each of the number of base sequences 301. The Kronecker product of the orthogonal matrix 300 and each of the number of base sequences 301 may involve determining the Kronecker product of each row or column n of the orthogonal matrix 300 and each cyclic shift index m of the base sequence 301, and repeating the operation for all permutations of n and m, where n=0, 1, . . . , N−1 and m=0, 1, . . . , M−1.

As such, the number of orthogonal sequences in the set may be equal to the product of the dimensions of the orthogonal matrix 300 and a matrix representation of the base sequences 301. For instance, the orthogonal matrix 300 may be a matrix of size N×N and the base sequences 301 may be represented by a matrix of size M×M and, therefore, the Kronecker product between the two may result in an (N*M)×(N*M) matrix (e.g., an orthogonal (N*M)×(N*M) matrix). In other words, the UE 115 or the base station 105, or both, may generate a number of orthogonal sequences equal to N*M and each orthogonal sequence may have a length of N*M. As such, each orthogonal sequence may have a length equal to the number of resource elements (e.g., the number of OFDM symbol×frequency tone resource elements) included in the resource grid that is allocated to the UE 115 for transmission of the payload. Further, based on using a Kronecker product of the orthogonal matrix 300 and the base sequence 301, the signal transmitted on each OFDM symbol may have the same PAPR as the base sequence 301, which may improve the coverage area of the UE 115 because the UE 115 may drive a power amplifier to a set power ratio and use a maximum transmit power of the UE 115 to transmit the signal. The generation of an individual orthogonal sequence using a Kronecker product is described in more detail with reference to FIG. 3B.

Figure 3B:
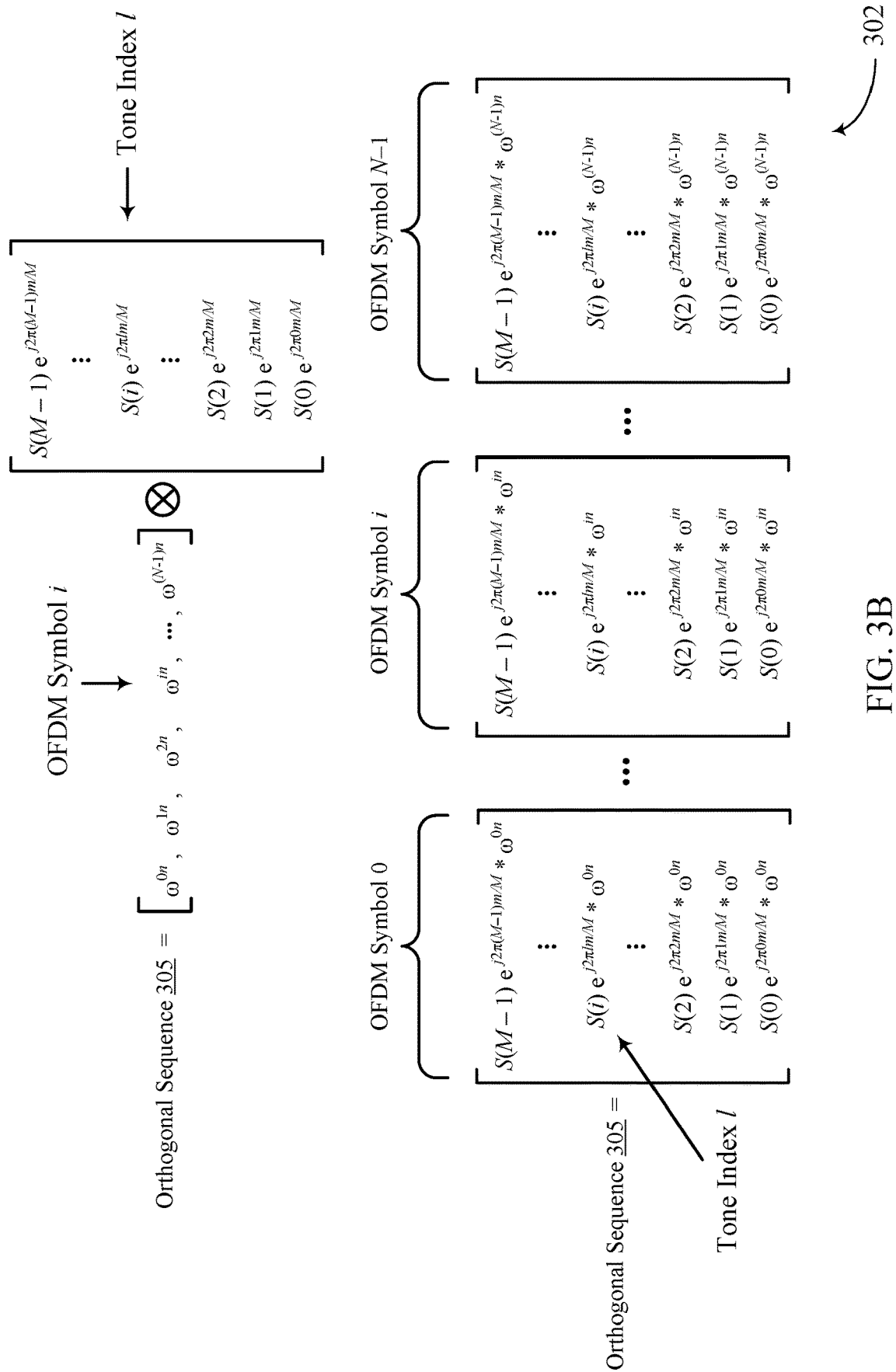
FIG. 3B illustrates an example of a mathematical operation that supports payload multiplexing with orthogonal sequences in accordance with aspects of the present disclosure.

FIG. 3B illustrates an example of a mathematical operation 302 that supports orthogonal sequence generation for multi-bit payloads in accordance with aspects of the present disclosure. The mathematical operation 302 may be an example of a Kronecker product of a row or a column (e.g., a vector) of the orthogonal matrix 300 and a base sequence 301. In some examples, a UE 115 or a base station 105, or both, which may be examples of corresponding devices as described herein, may perform the mathematical operation 302 to determine an orthogonal sequence 305 (e.g., a sequence that is orthogonal in time and frequency). The UE 115 or the base station 105, or both, may determine the orthogonal sequence 305 when generating the set of orthogonal sequences (e.g., the N*M orthogonal sequences), as described in more detail with reference to FIG. 3A. For example, the mathematical operation 302 may illustrate a step or an operation of the generation of the set of orthogonal sequences and, as such, the mathematical operation 302 may be similarly performed for each unique pair of row or column index n of the orthogonal matrix 300 and cyclic shift index m of the base sequence 301. For instance, the UE 115 or the base station 105, or both, may perform the mathematical operation 302 N*M times (e.g., to generate N*M orthogonal sequences 305).

The UE 115 or the base station 105, or both, may determine a row or a column index n of the orthogonal matrix 300 from the N−1 row and column indices of the orthogonal matrix 300 and a cyclic shift index m of the base sequence 301 from the M−1 cyclic shift indices of the base sequence 301. In other words, the UE 115 or the base station 105, or both, may determine the vector corresponding to the row or the column index n of the orthogonal matrix 300, which may be referred to as $\overrightarrow{DFT}(n)$ and be defined by Equation 1, and the vector corresponding to the cyclic shift index m of base sequence 301, which may be illustrated by base sequence $\vec{S}(m)$ (e.g., base sequence 301 may illustrate $\vec{S}$(cyclic index=m)).

The UE 115 or the base station 105, or both, may determine the Kronecker product of $\overrightarrow{DFT}(n)$ and $\vec{S}(m)$ to determine the orthogonal sequence 305. The Kronecker product is defined such that the base sequence $\vec{S}(m)$ is multiplied by each column of $\overrightarrow{DFT}(n)$ if $\overrightarrow{DFT}(n)$ is a row vector or by each row of $\overrightarrow{DFT}(n)$ if $\overrightarrow{DFT}(n)$ is a column vector. For instance, the Kronecker product of $\overrightarrow{DFT}(n)$ and $\vec{S}(m)$ may be defined by Equation 2, shown below and in expanded form in FIG. 3B.

$$\overrightarrow{DFT}(n) \otimes \vec{S}(m) = [\omega^{0n} * \vec{S}(m), \omega^{1n} * \vec{S}(m), \quad (2)$$
$$\omega^{2n} * \vec{S}(m), \cdots \omega^{in} * \vec{S}(m), \ldots, \omega^{(N-1)n} * \vec{S}(m)]$$

In some implementations, such as when $\overrightarrow{DFT}(n)$ and $\vec{S}(m)$ are either both row vectors or both column vectors, Equation 2 may generate a 1×(N*M) orthogonal sequence 305 (in the case that $\overrightarrow{DFT}(n)$ and $\vec{S}(m)$ are column vectors) or an (N*M)×1 orthogonal sequence 305 (in the case that $\vec{S}(n)$ and $\overrightarrow{DFT}(m)$ are row vectors). Alternatively, in some other implementations, $\vec{S}(n)$ may be a row vector and $\overrightarrow{DFT}(m)$ may be a column vector. In such implementations, Equation 2 may generate an orthogonal sequence of dimensions N×M. In such implementations, the UE 115 or the base station 105, or both, may concatenate each column below the lowest entry of the previous column to effectively generate a (N*M)×1 orthogonal sequence 305. The UE 115 or the base 105, or both, may perform such concatenation so that the orthogonal sequence 305 is represented as a column (or a row) and may be indexed in a codebook. In either implementation, each entry in the orthogonal sequence 305 may be associated with a unique (i, l) pair, where i may correspond to an OFDM symbol index of the N OFDM symbols of the resource allocation and l may correspond to a frequency tone index of the M frequency tones in the resource allocation. Accordingly, regardless of the specific implementation, the UE 115 or the base station 105 may map the generated orthogonal sequence 305 to the allocated resource grid such that an entry of the orthogonal sequence 305 corresponding to a unique (i, l) pair maps to a resource element of the resource grid associated with the (i, l) pair (e.g., the resource element at the $i^{th}$ OFDM symbol and the $l^{th}$ frequency tone of the resource grid).

In some examples, an OFDM symbol index i=0 may correspond to the first OFDM symbol (e.g., the temporally earliest) of the resource allocation and a frequency tone index i=0 may correspond to the lowest frequency tone (e.g., the lowest frequency subcarrier) of the resource allocation. Likewise, an OFDM symbol index i=N−1 may correspond to the last (e.g., the temporally latest) OFDM symbol of the resource allocation and a frequency tone index i=M−1 may correspond to the highest frequency tone (e.g., the highest frequency subcarrier) of the resource allocation.

Such generation of a set of orthogonal sequences 305 may be correspond a spreading of the base sequence 301 in the time-domain (e.g., based on a CDMA concept) via the orthogonal matrix 300 (e.g., using a DFT vector in the time-domain) and a phase ramping in the frequency-domain based on the cyclic shift index of the base sequence 301. As described with reference to FIG. 2, the phase ramping in the frequency-domain may correspond to (e.g., be equivalent to) a cyclic shift in the time-domain. In the case that the orthogonal matrix is a DFT matrix, the described techniques may also correspond to a DFT-based orthogonal cover code and cyclic shift-based multiplexing representation of the payload for a single user. Further, the implementations of the present disclosure may correspond to an index modulation scheme using N DFT dimensions and M cyclic shift dimensions to carry a number of bits based on the N and M dimensions. For instance, such an index modulation scheme may carry the payload based on an on-off pattern on the N*M tones of the orthogonal sequence 305. When using index modulation, the UE 115 may convey different information by using different on-off patterns on the N*M tones of the orthogonal sequence 305. In some examples, the described techniques may be implemented to carry $\log_2$(N*M) bits based on having N DFT dimensions and M cyclic shift dimensions (e.g., an orthogonal sequence 305 of length N*M generated by the orthogonal matrix 300 and the base sequence 301 may carry $\log_2$(N*M) bits).

As such, the UE 115 or the base station 105, or both, may determine the orthogonal sequence 305 that may convey a payload across the resources allocated for the transmission of the payload. The UE 115 or the base station 105, or both may repeat the mathematical operation 302 for each unique pair of row or column index n of the orthogonal matrix 300 and each cyclic shift index m of the base sequence 301 (i.e., each unique (n, m) pair) to generate N*M orthogonal sequences 305, where each of the N*M orthogonal sequences 305 may convey the payload across each resource element in the resource grid defined by N OFDM symbols and M frequency tones. In some implementations, the UE 115 or the base station 105, or both, may construct a codebook of a subset of the N*M orthogonal sequences 305 based on the number of bits in the payload.

In some aspects, the orthogonal matrix 300 may be an example of a second orthogonal matrix is used as a basis, along with the parameter configured by the base station, for generating a plurality of first orthogonal matrices, as is described in further detail with reference to FIGS. 4 through 6.

Figure 4:
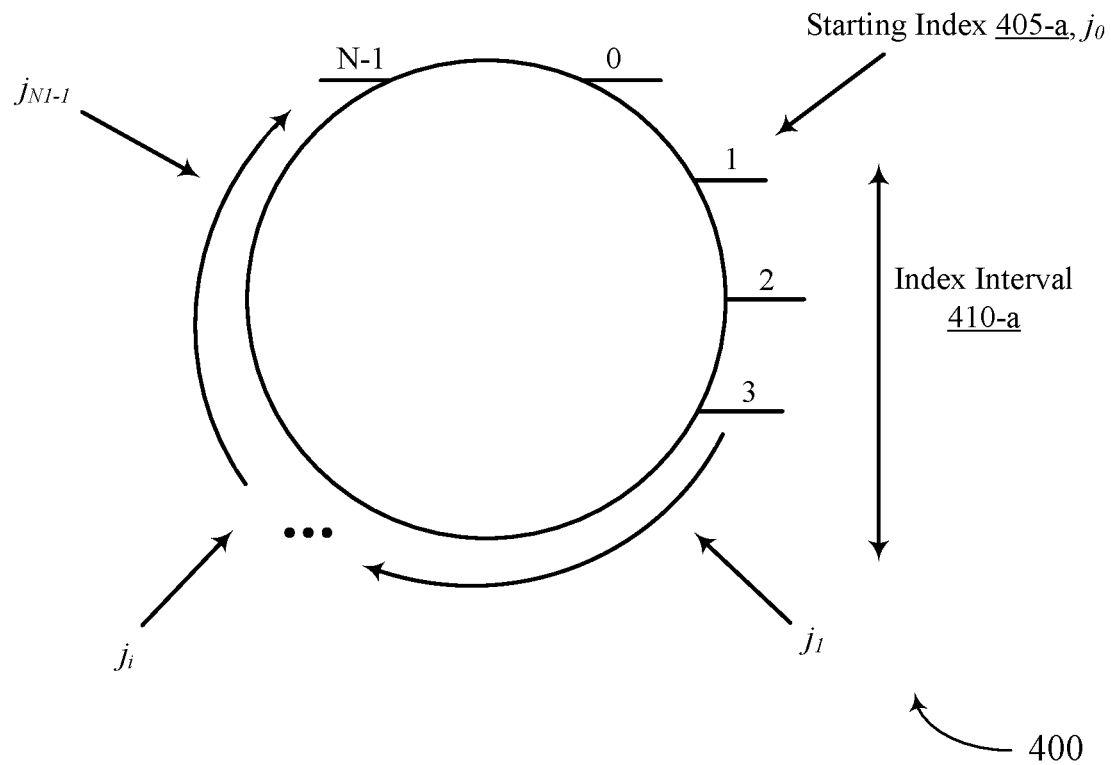
FIG. 4 illustrates examples of sets of indices that support payload multiplexing with orthogonal sequences in accordance with aspects of the present disclosure.
Figure 4:
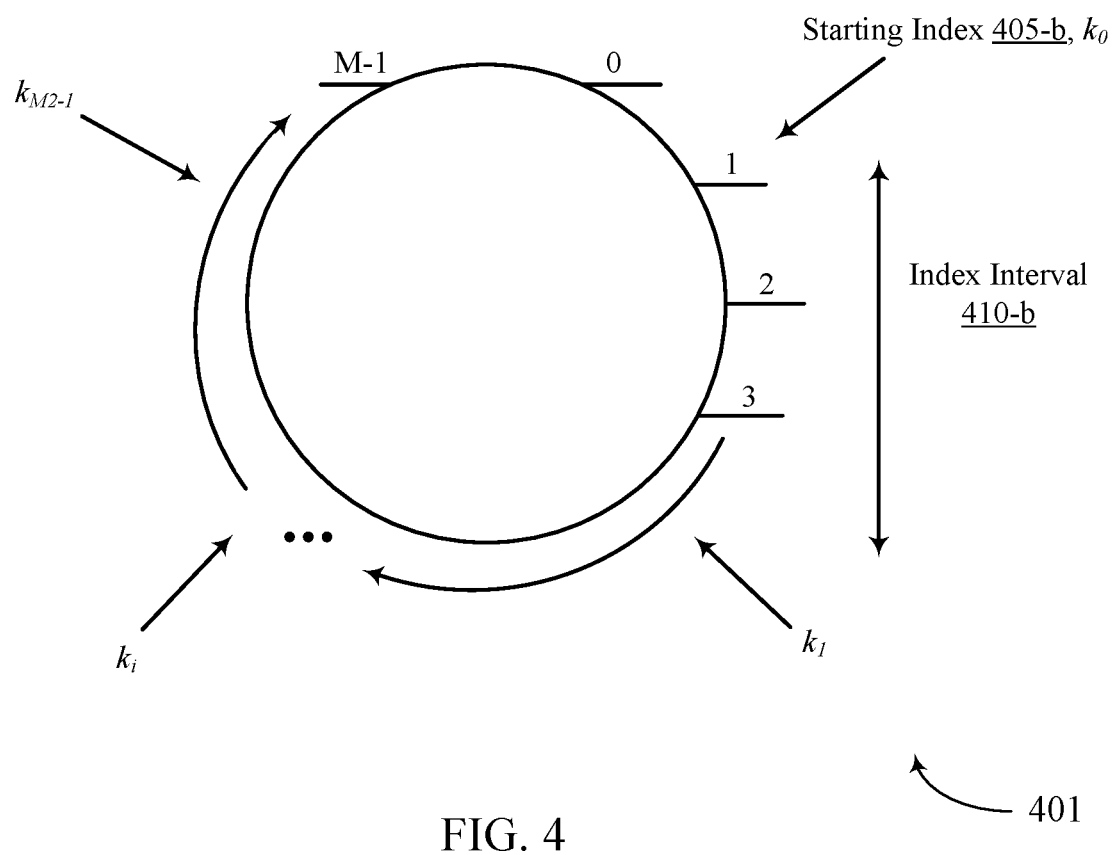

FIG. 4 illustrates an example of sets of indices 400 and 401 that supports payload multiplexing with orthogonal sequences in accordance with aspects of the present disclosure. In some examples, the set of indices 400 may correspond to a circular visualization of the row or column indices n=0, 1, 2, . . . , N−1 of the orthogonal matrix and the set of indices 401 may correspond to a circular visualization of the cyclic shift indices m=0, 1, 2, . . . , M−1 of the base sequence. The UE 115 or the base station 105, which may be examples of corresponding devices as described herein, or both, may employ the circular visualization of the N row or column indices of the orthogonal matrix and the M cyclic shift indices of the base sequence to determine the subset of orthogonal sequences to include in a codebook. For example, the UE 115 or the base station 105, or both, may determine that the size of the payload is K bits and may select a number of orthogonal sequences (e.g., $2^K$ orthogonal sequences) from the generated N*M orthogonal sequences based on the sets of indices 400 and 401.

As described herein, the UE 115 or the base station 105, or both, may determine that the payload includes K bits and may determine that the size of the codebook including the subset of orthogonal sequences is $2^K$ (e.g., the codebook may include $2^K$ orthogonal sequences) based on the K bits in the payload. In some implementations, the UE 115 or the base station 105, or both, may select the subset of orthogonal sequences by determining two values, K1 and K2, where K1+K2=K. K1 bits of the K bits may convey UCI of a first type (e.g., one of HARQ-ACK or CSI) and K2 bits of the K bits may convey UCI of a second type (e.g., the other of HARQ-ACK or CSI). The UCI of the first and second type may be referred to as first and second portions of the UCI or of a payload. In some aspects, the base station 105 may determine the values K1 and K2 and may signal the values to the UE 115. As such, the UE 115 may determine the values K1 and K2 based on receiving the signaling from the base station 105.

The UE 115 may determine a number of indices N1 and a number of indices M2 based on the signaled values of K1 and K2, where N1 may correspond to a number of the N DFT indices of the orthogonal matrix (e.g., N1 indices in the DFT domain) and M2 may correspond to a number of the M cyclic shift indices of the base sequence (e.g., M2 indices in the cyclic shift domain). In some implementations, the UE 115 may determine that N1=$2^{K1}$ and that M2=$2^{K2}$, where N1≤N and M2≤M. As such, the UE 115 may determine values for N1 and M2 based on the signaled values K1 and K2 and, in some examples, may select the subset of orthogonal sequences based on N1 and M2.

For example, the UE 115 may select N1 DFT indices from the n=0, 1, 2, . . . , N−1 DFT indices of the orthogonal matrix and M2 CS indices of the m=0, 1, 2, . . . , M−1 CS indices of the base sequence. Each of the selected N1 DFT indices may correspond to a bit value for the K1 bits. For instance, if K1=2, four indices may be selected. A first selected DFT index may correspond to when the K1 bits have the value '00', a second selected DFT index may correspond to when the K1 bits have the value '01', a third selected DFT index may correspond to when the K1 bits have the value '10', and a fourth selected DFT index may correspond to when the K1 bits have the value '11'. Similarly, each of the selected M2 CS indices may correspond to a bit value for the K2 bits. For instance, if K2=2, four indices may be selected. A first selected CS index may correspond to when the K2 bits have the value '00', a second selected CS index may correspond to when the K2 bits have the value '01', a third selected CS index may correspond to when the K2 bits have the value '10', and a fourth selected CS index may correspond to when the K2 bits have the value '11'. In some implementations, the UE 115 may select the N1 DFT indices of the orthogonal matrix based on maintaining a largest possible gap between the selected indices (e.g., a largest possible gap based on the circular visualization of the N indices in the set of indices 400). As such, the UE 115 may mitigate the influence of channel doppler shift on the transmission of the payload. Similarly, the UE 115 may select the M2 CS indices of the base sequence based on maintaining a largest possible gap between the selected indices (e.g., a largest possible gap based on the circular visualization of the M indices in the set of indices 401). As such, the UE 115 may mitigate the influence of channel delay spread on the transmission of the payload.

In some examples, the UE 115 may determine the indices (e.g., the values of n and m) associated with the subset of orthogonal sequences based on the values based on the number of the indices N1 and M2, a starting index 405-a, a starting index 405-b, an index interval 410-a, and an index interval 410-b. The starting index 405-a may correspond to a starting row or column index $j_0$ of the orthogonal matrix that the UE 115 may use to determine one or more orthogonal sequences and as a starting reference point from which to determine the other N1−1 row or column indices of the orthogonal matrix that may be used to determine one or more additional orthogonal sequences. Similarly, the starting index 405-b may correspond to a starting CS index $k_0$ that the UE 115 may use to determine one or more orthogonal sequences and as a starting reference point from which to determine the other M2−1 CS indices of the base sequence that may be used to determine one or more additional orthogonal sequences. Although $j_0$ and $k_0$ may be shown to correspond to index values of $j_0=1$ and $k_0=1$ in FIG. 4, $j_0$ and $k_0$ may correspond to any index n=0, 1, 2, ..., N−1 or m=0, 1, 2, ..., M−1, respectively.

The index interval 410-a may refer to an interval or an offset between two nearest selected DFT indices of the orthogonal matrix. Similarly, the index interval 410-b may refer to an interval or an offset between two nearest selected cyclic shift indices of the base sequence. As such, the UE 115 may determine a second DFT index of the orthogonal matrix, such as $j_1$, based on the index interval 410-a and the starting index 405-a (e.g., based on adding the index interval 410-a to the starting index 405-a). Likewise, the UE 115 may determine an $i^{th}$ DFT index of the orthogonal matrix, such as $j_i$, based on progressively adding the index interval 410-a to the starting index 405-a or based on a mathematical operation, such as described by Equation 3, shown below.

$$j_i = j_0 + (i * j_{Offset}) \tag{3}$$

The UE 115 may continue determining indices of the orthogonal matrix in this manner until the UE 115 identifies the N1 DFT indices of the orthogonal matrix (e.g., until the UE 115 identifies $j_{N1-1}$). The UE 115 may likewise perform a similar procedure to determine the M2 CS indices of the base sequence using the index interval 410-b and the starting index $k_0$. As illustrated in FIG. 4, the UE 115 may determine a second CS index $k_1$, an $i^{th}$ cyclic shift index $k_i$, and so on until the UE 115 determines M2 CS indices (e.g., until the UE 115 determines cyclic shift index $k_{M2-1}$).

In some implementations, the base station 105 may signal, to the UE 115, an indication of the starting index 405-a and the starting index 405-b. Additionally, or alternatively, in some examples, the base station 105 may signal, to the UE 115, an indication of the index interval 410-a and the index interval 410-b that the UE 115 may use to determine the N1 and M2 indices. Additionally or alternatively, the UE 115 may determine or derive the index interval 410-a and the index interval 410-b based on determining the maximum possible distance between the selected indices.

For example, the UE 115 may determine the index interval 410-a based on dividing the total number of DFT indices N by the number of indices N1. For instance, the UE 115 may determine that N1=4 and the UE 115 may divide the number of row or column indices N by 4 to determine the maximum index interval 410-a (e.g., the maximum index spacing or offset) between 4 selected indices. Similarly, the UE 115 may determine the index interval 410-b based on dividing the total number of CS indices M by the number of indices M2. For instance, the UE 115 may determine that M2=4 and the UE 115 may divide the number of CS indices M by 4 to determine the maximum index interval 410-b between 4 selected indices. In some cases, however, N1 or M2, or both, may be unable to divide into N or M, respectively, evenly. In such cases, the UE 115 may employ a function (e.g., a rounding function or a rounding operation) to determine the index interval 410-a or the index interval 410-b. For example, the function may include a modulo function, a floor function, a ceiling function, or a combination thereof.

In some examples where N1 fails to divide evenly into N and N1=4, the UE 115 may determine the four selected DFT indices of the orthogonal matrix based on Equations 4, 5, and 6, shown below.

$$\{k, \mathrm{mod}(k + \mathrm{floor}(N/N1), N), \tag{4}$$
$$\mathrm{mod}(K + \mathrm{floor}(2N/N1), N), \mathrm{mod}(K + \mathrm{floor}(3N/N1), N)\}$$

$$\{k, \mathrm{mod}(k + \mathrm{ceil}(N/N1), N), \tag{5}$$
$$\mathrm{mod}(K + \mathrm{ceil}(2N/N1), N), \mathrm{mod}(K + \mathrm{ceil}(3N/N1), N)\}$$

$$\{k, \mathrm{mod}(k + \mathrm{floor}(N/N1), N), \tag{6}$$
$$\mathrm{mod}(K + \mathrm{ceil}(2N/N1), N), \mathrm{mod}(K + \mathrm{floor}(3N/N1), N)\}$$

As described by Equations 4, 5, and 6, the four selected DFT indices of the orthogonal matrix may be notated by {k, $k_1$, $k_2 k_3$,}, where k corresponds to the starting index 405 in this example. The UE 115 or the base station 105, or both, may use similar equations to select indices from the base sequence. For example, in an example where M2=4, the UE 115 or the base station 105, or both, may select CS indices of the base sequence as described in Equations 4, 5, and 6 by replacing N with M and N1 with M2. Equations 4, 5, and 6 are shown to illustrate some examples of the present disclosure (e.g., when N1=4), and the UE 115 may use different equations other than or in addition to Equations 4, 5, and 6 to determine the selected indices without exceeding the scope of the present disclosure.

The UE 115, upon determining the number of indices N1 and M2, the starting index 405-a, the starting index 405-b, the index interval 410-a, and the index interval 410-b, may have sufficient information to select N1 DFT indices of the orthogonal matrix and M2 CS indices of the base sequence. In some implementations, the UE 115 may determine the orthogonal sequences of the generated set of orthogonal sequences associated with the selected indices. For instance, the UE 115 may determine a number of orthogonal sequences corresponding to each combination or permutation of the N1 DFT indices of the orthogonal matrix and the M2 CS indices of the base sequence. For example, the UE 115 may identify each orthogonal sequence of the set of orthogonal sequences that corresponds to a Kronecker product of at least one of the selected N1 DFT indices of the orthogonal matrix and at least one of the selected M2 CS indices of the base sequence. Accordingly, the UE 115 may determine $N1*M2=2^{K1}*2^{K2}=2^{K1+K2}=2^K$ orthogonal sequences from the set of M*N orthogonal sequences.

The UE 115 may construct a codebook with each of the selected $2^K$ orthogonal sequences such that each of the selected orthogonal sequences is associated with an index in the codebook. In some examples, the UE 115 may use the codebook to transmit a payload of an uplink transmission that includes K bits, K1 of which correspond to UCI of a first type (e.g., one of HARQ-ACK or CSI) and K2 of which correspond to UCI of a second type (e.g., the other of HARQ-ACK or CSI). Using the values of the K1 bits and the K2 bits, the UE 115 may determine a decimal number corresponding to an index of the codebook. For instance, if K1=1 and the K1 bits have the value '0' and K2=2 and the K2 bits have the value '01', the UE 115 may determine an index that points to the orthogonal sequence of the codebook whose DFT index corresponds to the value '0' and whose CS index corresponds to the value '01'. If N=14 and the DFT indices selected for the codebook were 2 and 9, where 2 corresponds to a '0' and 9 corresponds to '1', the UE 115 may select an orthogonal sequence corresponding to the DFT index with value 2. Similarly, if M=12 and the CS indices selected for the codebook were 0, 3, 6, and 9, where 0 corresponds to a '00', 3 corresponds to a '10', 6 corresponds to a '01' and 9 corresponds to a '11,' the UE 115 may select an orthogonal sequence corresponding to the CS index with a value 3. Thus, the UE 115 may select an orthogonal sequence corresponding to DFT index 2 and CS index 3.

In some examples, the UCI mapped to each domain may depend on the priority of each UCI and the maximum index interval of each domain. A maximum index interval may be defined as a maximum possible interval between indices in a set of indices 400 or 401. For instance, the maximum index interval of the set of indices 400 may be equal to $$\text{floor}\left(\frac{N}{2}\right) \text{ or ceiling}\left(\frac{N}{2}\right)$$

and the maximum index interval of the set of indices 401 may be equal to $$\text{floor}\left(\frac{M}{2}\right) \text{ or ceiling}\left(\frac{M}{2}\right).$$

If a first UCI type (e.g., HARQ-ACK) has a greater priority than a second UCI type (e.g., CSI) and the maximum index interval of the set of indices 400 is greater than the maximum index interval of the set of indices 401, the first UCI type may map to the DFT domain and the second UCI type may map to the CS domain. As such, the K1 bits of the payload transmitted by the UE may convey UCI of the first type and the K2 bits of the payload transmitted by the UE may convey UCI of the second type. Alternatively, if the maximum index interval of the set of indices 401 is greater than the maximum index interval of the set of indices 400, the first UCI type may map to the CS domain and the second UCI type may map to the DFT domain. As such, the K1 bits of the payload transmitted by the UE may convey UCI of the second type and the K2 bits of the payload transmitted by the UE may convey UCI of the first UCI type.

Mapping the higher priority UCI type to the domain that has a higher maximum index interval may be associated with one or more advantages. For instance, in a case where K1=K2, a base station may have a higher likelihood of successfully recovering the bits from the domain that has the higher maximum index interval compared to the domain that has the lower maximum index interval.

Figure 5:
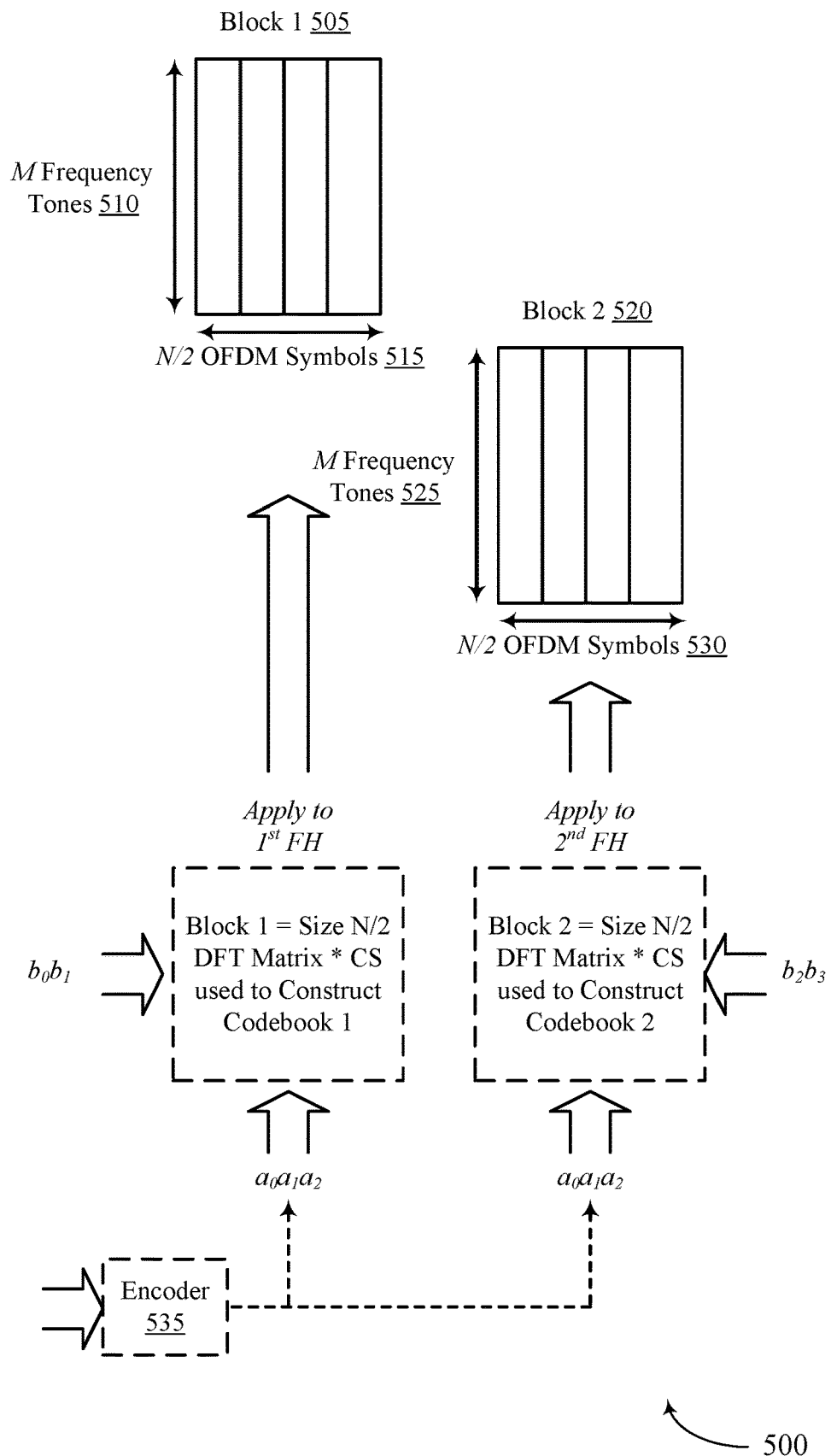
FIG. 5 illustrates an example of a matrix configuration that supports payload multiplexing with orthogonal sequences in accordance with aspects of the present disclosure.

FIG. 5 illustrates an example of a matrix configuration 500 that supports payload multiplexing with orthogonal sequences in accordance with aspects of the present disclosure. In some examples, matrix configuration 500 may be implemented to realize aspects of wireless communications system 100 and wireless communications system 200 as well as orthogonal matrix 300 and matrix configuration 400. For example, a UE or a base station, or both, may use the matrix configuration 500 to generate a set of orthogonal sequences from which the UE may select an orthogonal sequence to convey a payload to the base station. The UE and the base station may be examples of corresponding devices as described herein.

As discussed above, aspects of the described techniques break an N*M matrix (e.g., a second orthogonal matrix) into L smaller block matrices (e.g., a plurality of first orthogonal matrices) where each block is orthogonal and the size of each block is (N*M)/L. Each of the first codebook 505 and the second codebook 520 may include a plurality of orthogonal sequences. The network (e.g., via the base station) may choose, signal, or otherwise configure the parameter L as a trade-off between the UCI data rate and reliability, e.g., based on a SNR, congestion levels, throughput requirements, reliability requirements, and the like. That is, the value of the parameter L can be based on the channel quality metric in order to select the best tradeoff based on current conditions.

Accordingly, the base station may transmit configuration signaling to the UE indicating a parameter (e.g., L or other parameters) for generating a plurality of first orthogonal matrices (e.g., such as the first codebook 505 and the second codebook 520 of the plurality of codebooks). The first orthogonal matrices may be based on DFT=(N/L)*CS (M). The first codebook 505 may span M frequency tones 510 in the frequency domain (e.g., the DFT domain) and N/2 OFDM symbols 515 in the time domain (e.g., the CS domain). Similarly, the second codebook 520 may span M frequency tones 525 in the frequency domain (e.g., the DFT domain) and N/2 OFDM symbols 530 in the time domain (e.g., the CS domain).

The M frequency tones 510 of the first codebook 505 may include or span the same or a different number of tones as the M frequency tones 525 of the second codebook 520. Although illustrated as using different CS domain symbols, it is to be understood that the N/2 OFDM symbols 515 of the first codebook 505 may include or span the same or a different number of symbols as the N/2 frequency tones 525 of the second codebook 520. That is, the size of each orthogonal matrix is the plurality of orthogonal matrices may be based on a division of the size of the second orthogonal matrix.

The plurality of first orthogonal matrices may be based on a second orthogonal matrix (e.g., as discussed above and based on DFT(N)*CS(M)) where a size of the second orthogonal matrix is based on the number of N OFDM symbols and M frequency tones configured for conveying a payload. The UE or base station, or both, may generate a plurality of codebooks corresponding to the plurality of first orthogonal matrices, such as the first codebook 505 and the second codebook 520. The UE may transmit (and base station may receive) a first portion of the payload using a first sequence from the first codebook 505 of the plurality of codebooks and a second portion of the payload using the second codebook 520 of the plurality of codebooks. That is, the UE may select a first sequence from the first codebook 505 to use for transmission of the first portion of the payload and select a second sequence from the second codebook 520 to use for transmission of the second portion of the payload.

Matrix configuration 500 illustrates an example where the first and second portions of the payload are transmitted according to a frequency hopping configuration. That is, frequency hopping may be enabled on PUCCH for the UE. Matrix configuration 500 illustrates an example where block-wise orthogonal sequence based PUCCH can be applied to generate two smaller blocks (in two frequency hops, respectively) to transmit the same UCI bits, e.g., to explore the frequency diversity for higher UCI transmission reliability. The base station may transmit or otherwise convey configuration signaling to the UE that identifies or otherwise indicates the ordering to the first and second portions of bits that is based on the frequency hopping configuration, e.g., the mapping between the first/second portions of bits to the first/second frequency hops.

As one example where there are 14 OFDM symbols for the second orthogonal matrix, with frequency hopping the first codebook 505 may have a size of DFT(7)*CS (e.g., span 7 symbols) and the second codebook 520 may have a size of DFT(7)*CS (e.g., span 7 symbols). Thus, the second codebook 520 may be the same size as the first codebook 505.

In the example, the UE may transmit subsets of a payload (e.g., one for each codebook), where each subset includes 3 bits conveying higher priority UCI (e.g., HARQ-ACK), which may be referred to as a first portion of the payload, and 2 bits conveying lower priority UCI (e.g., CSI), which may be referred to as a second portion of the payload. For instance, the subset transmitted using first codebook 505 in the first frequency hop may include bits $b_0 b_1$ (e.g., a first subset of the second portion of the payload) conveying two bits of lower priority UCI and bits $a_0 a_1 a_2$ conveying three bits of higher priority UCI. Similarly, the payload transmitted using second codebook 520 in the second frequency hop may include bits $b_2 b_3$ (e.g., a second subset of the second portion of the payload) conveying two bits of lower priority UCI and bits $a_0 a_1 a_2$ conveying three bits of higher priority UCI. The two bits of lower priority UCI transmitted using first codebook 505 (e.g., $b_0 b_1$) may be different than the two bits of lower priority UCI transmitted using second codebook 520 (e.g., $b_2 b_3$). The three bits of higher priority UCI transmitted using both codebook 505 and 520, however, may be the same. Transmitting the same bits twice may increase a likelihood that the receiving base station may successfully receive and decode those same bits. In some examples, the UE may encode the bits $a_0 a_1 a_2$ using an encoder 535. For instance, in the present example, the UE may encode the bits $a_0 a_1 a_2$ using repetition encoding and may transmit the bits using the first codebook 505 and the second codebook 520.

The decomposed DFT domain may have a smaller maximum index interval compared to the non-decomposed CS domain. Thus, as described herein, the lower priority UCI may map to the decomposed DFT domain and the higher priority UCI may map to the non-decomposed CS domain. In the present example, the two bits of the lower priority UCI may be conveyed per codebook. Thus, the index interval between each DFT domain index may be $$\text{floor}\left(\frac{7}{2^2}\right) = 1 \text{ or ceiling}\left(\frac{7}{2^2}\right) = 2.$$

Additionally, or alternatively, three bits of the higher priority UCI may be conveyed per codebook. Thus, the index interval between each CS domain index may be $$\text{floor}\left(\frac{12}{2^3}\right) = 1 \text{ or ceiling}\left(\frac{12}{2^3}\right) = 2.$$

In some examples, the base station may transmit configuration signaling to the UE indicating an ordering of the first subset of bits and the second subset of bits based on the frequency hopping configuration. For example, relevant standards may provide a mapping to be followed, with the base station providing an index or other indicator to a particular mapping. For example, the mapping may correspond to the first portion of the payload being mapped to a first frequency portion associated with the frequency hopping configuration, the second portion of the payload to a second frequency portion of the frequency hopping configuration, and so forth. In some aspects, the ordering for the portions being mapped may be based from most significant bits (MSB) to least significant bits (LSB), or vice versa. In other examples, the base station may explicitly transmit the mapping indication to the UE.

Figure 6:
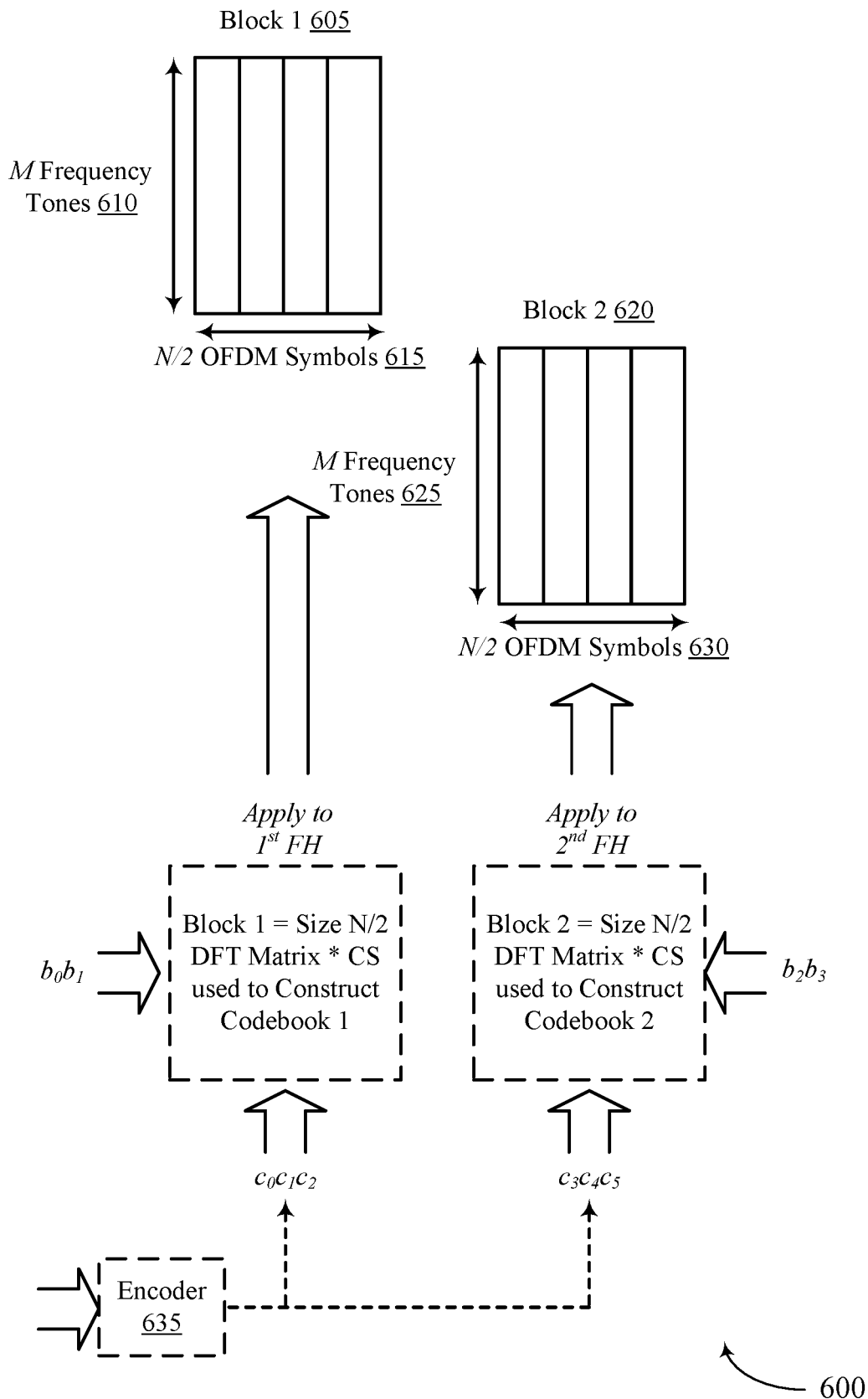
FIG. 6 illustrates an example of a matrix configuration that supports payload multiplexing with orthogonal sequences in accordance with aspects of the present disclosure.

FIG. 6 illustrates an example of a matrix configuration 600 that supports payload multiplexing with orthogonal sequences in accordance with aspects of the present disclosure. In some examples, matrix configuration 600 may be implemented to realize aspects of wireless communications system 100 and wireless communications system 200 as well as orthogonal matrix 300 and matrix configuration 500. For example, a UE or a base station, or both, may use the matrix configuration 600 to generate a set of orthogonal sequences from which the UE may select an orthogonal sequence to convey a payload to the base station. The UE and the base station may be examples of corresponding devices as described herein.

As discussed above, aspects of the described techniques break an N*M matrix (e.g., a second orthogonal matrix) into L smaller block matrices (e.g., a plurality of first orthogonal matrices) where each block is orthogonal and the size of each block is (N*M)/L. Each of the first codebook 605 and the second codebook 620 may include a plurality of orthogonal sequences. The network (e.g., via the base station) may choose, signal, or otherwise configure the parameter L as a trade-off between the UCI data rate and reliability, e.g., based on a SNR, congestion levels, throughput requirements, reliability requirements, and the like. That is, the value of the parameter L can be based on the channel quality metric in order to select the best tradeoff based on current conditions.

Accordingly, the base station may transmit configuration signaling to the UE indicating a parameter (e.g., L or other parameters) for generating a plurality of first orthogonal matrices (e.g., such as the first codebook 605 and the second codebook 620 of the plurality of codebooks). The first orthogonal matrices may be based on DFT=(N/L)*CS (M). The first codebook 605 may span M frequency tones 610 in the frequency domain (e.g., the DFT domain) and N/2 OFDM symbols 615 in the time domain (e.g., the CS domain). Similarly, the second codebook 620 may span M frequency tones 625 in the frequency domain (e.g., the DFT domain) and N/2 OFDM symbols 630 in the time domain (e.g., the CS domain).

The M frequency tones 610 of the first codebook 605 may include or span the same or a different number of tones as the M frequency tones 625 of the second codebook 620. Although illustrated as using different CS domain symbols, it is to be understood that the N/2 OFDM symbols 615 of the first codebook 605 may include or span the same or a different number of symbols as the N/2 frequency tones 625 of the second codebook 620. That is, the size of each orthogonal matrix is the plurality of orthogonal matrices may be based on a division of the size of the second orthogonal matrix.

The plurality of first orthogonal matrices may be based on a second orthogonal matrix (e.g., as discussed above and based on DFT(N)*CS(M)) where a size of the second orthogonal matrix is based on the number of N OFDM symbols and M frequency tones configured for conveying a payload. The UE or base station, or both, may generate a plurality of codebooks corresponding to the plurality of first orthogonal matrices, such as the first codebook 605 and the second codebook 620. The UE may transmit (and base station may receive) a first portion of the payload using a first sequence from the first codebook 605 of the plurality of codebooks and a second portion of the payload using the second codebook 620 of the plurality of codebooks. That is, the UE may select a first sequence from the first codebook 605 to use for transmission of the first portion of the payload and select a second sequence from the second codebook 620 to use for transmission of the second portion of the payload.

Matrix configuration 600 illustrates an example where the first and second portions of the payload are transmitted according to a frequency hopping configuration. That is, frequency hopping may be enabled on PUCCH for the UE. Matrix configuration 600 illustrates an example where block-wise orthogonal sequence based PUCCH can be applied to generate two smaller blocks (in two frequency hops, respectively) to transmit different UCI bits, e.g., to increase UCI transmission capacity. The base station may transmit or otherwise convey configuration signaling to the UE that identifies or otherwise indicates the ordering to the first and second portions of bits that is based on the frequency hopping configuration, e.g., the mapping between the first/second portions of bits to the first/second frequency hops.

As one example where there are 14 OFDM symbols for the second orthogonal matrix, with frequency hopping the first codebook 605 may have a size of DFT(7)*CS (e.g., span 7 symbols) and the second codebook 620 may have a size of DFT(7)*CS (e.g., span 7 symbols). Thus, the second codebook 620 may be the same size as the first codebook 605.

In the example, the UE may transmit subsets of a payload (e.g., one for each codebook), where each subset includes 3 bits conveying higher priority UCI (e.g., HARQ-ACK), which may be referred to as a first portion of the payload, and 2 bits conveying lower priority UCI (e.g., CSI), which may be referred to as a second portion of the payload. For instance, the subset transmitted using first codebook 605 in the first frequency hop may include bits $b_0 b_1$ (e.g., a first subset of the second portion of the payload) conveying two bits of lower priority UCI and bits $c_0 c_1 c_2$ conveying three bits of higher priority UCI. Similarly, the payload transmitted using second codebook 620 in the second frequency hop may include bits $b_2 b_3$ (e.g., a second subset of the second portion of the payload) conveying two bits of lower priority UCI and bits $c_3 c_4 c_5$ conveying three bits of higher priority UCI. The two bits of lower priority UCI transmitted using first codebook 605 (e.g., $b_0 b_1$) may be different than the two bits of lower priority UCI transmitted using second codebook 620 (e.g., $b_2 b_3$). The three bits of higher priority UCI transmitted using both codebook 605 and 620 (e.g., $c_0 c_1 c_2$ versus $c_3 c_4 c_5$), likewise, may be different. However, in some cases, $c_0 c_1 c_2 c_3 c_4 c_5$ may represent three bits $a_0 a_1 a_2$ that the UE encoded using an encoder 635 (e.g., an encoder 635 encoding with a Reed-Muller code). As such, even though the UE may transmit different sets of bits, the sets of bits may correspond to three bits $a_0 a_1 a_2$. As such, the three bits $a_0 a_1 a_2$ may still be transmitted with a same reliability. Encoding a set of bits to be transmitted in multiple codebooks may increase a likelihood that the receiving base station successfully receives and decodes those bits.

The decomposed DFT domain may have a smaller maximum index interval compared to the non-decomposed CS domain. Thus, as described herein, the lower priority UCI may map to the decomposed DFT domain and the higher priority UCI may map to the non-decomposed CS domain. In the present example, the two bits of the lower priority UCI may be conveyed per codebook. Thus, the index interval between each DFT domain index may be $$\text{floor}\left(\frac{7}{2^2}\right) = 1 \text{ or ceiling}\left(\frac{7}{2^2}\right) = 2.$$

Additionally, or alternatively, three bits of the higher priority UCI may be conveyed per codebook. Thus, the index interval between each CS domain index may be $$\text{floor}\left(\frac{12}{2^3}\right) = 1 \text{ or ceiling}\left(\frac{12}{2^3}\right) = 2.$$

In some examples, the base station may transmit configuration signaling to the UE indicating an ordering of the first subset of bits and the second subset of bits based on the frequency hopping configuration. For example, relevant standards may provide a mapping to be followed, with the base station providing an index or other indicator to a particular mapping. For example, the mapping may correspond to the first portion of the payload being mapped to a first frequency portion associated with the frequency hopping configuration, the second portion of the payload to a second frequency portion of the frequency hopping configuration, and so forth. In some aspects, the ordering for the portions being mapped may be based from most significant bits (MSB) to least significant bits (LSB), or vice versa. In other examples, the base station may explicitly transmit the mapping indication to the UE.

Accordingly, the UE may transmit the first portion of the payload (e.g., based on the first codebook 605) over the first frequency portion and the second portion of the payload (e.g., based on the second codebook 620) over the second frequency portion of the frequency hopping configuration to the base station. The base station may receive each portion of the payload (e.g., multiple subsets or portions of bits) according to the plurality of codebooks corresponding to the plurality of first orthogonal matrices and the frequency hopping configuration.

Figure 7:
FIG. 7 illustrates an example of a process flow that supports payload multiplexing with orthogonal sequences in accordance with aspects of the present disclosure.

FIG. 7 illustrates an example of a process flow 700 that supports payload multiplexing with orthogonal sequences in accordance with aspects of the present disclosure. In some examples, process flow 700 may implement aspects of wireless communications systems 100 or 200, orthogonal matrix 300, or matrix configurations 500 or 600. Aspects of process flow 700 may be implemented by UE 115-*b* or base station 105-*b*, which may be examples of the corresponding devices described herein.

At 705, base station 105-*b* may transmit configuration signaling indicating a parameter for generating a set of orthogonal matrices. A size of each orthogonal matrix of the set of orthogonal matrices may be based on a value of the parameter.

At 710-*a*, UE 115-*b* may identify a first portion of a payload and a second portion of the payload. The first portion of the payload may be associated with a first priority and the second portion of the payload may be associated with a second priority that is less than the first priority. Additionally or alternatively, the first portion of the payload may be associated with a higher reliability requirement than the second portion of the payload. At 710-*b*, base station 105-*b* may identify the first portion of the payload and the second portion of the payload. In some examples, the first portion of the payload includes feedback process information (e.g., HARQ-ACKs) and the second portion of the payload may include CSI.

At 715-*a*, UE 115-*b* may select a first matrix associated with a first domain for transmitting the first portion of the payload. At 715-*b*, base station 105-*b* may select the first matrix.

At 720-*a*, UE 115-*b* may generate a first codebook associated with the first matrix. At 720-*b*, base station 105-*b* may generate the first codebook associated with the first matrix. The codepoints of the first codebook may be based on the first maximum index interval. In some examples, the first maximum index interval may be based on a size of the first matrix and a first number of bits associated with the first portion of the payload.

At 725-*a*, UE 115-*b* may select a second matrix associated with a second domain for transmitting the second portion of the payload. At 725-*b*, base station 105-*b* may select the second matrix. UE 115-*b* or base station 105-*b* may select the first and second matrix based on a first maximum index interval for the first matrix being larger than a second maximum index interval for the second matrix. In some examples, UE 115-*b* and/or base station 105-*b* may generate the set of orthogonal matrices based on the selected second matrix. In some examples, the second maximum index interval may be based on a size of the second matrix and a second number of bits associated with the second portion of the payload At 730-*a*, UE 115-*b* may generate a set of second codebooks based on the set of orthogonal matrices (e.g., the set of orthogonal matrices generated using the parameter indicated at 705). At 730-*b*, base station 105-*b* may generate the set of second codebooks based on the set of orthogonal matrices. The codepoints of the set of second codebooks may be based on a maximum index interval for each of the set of orthogonal matrices. In some examples, UE 115-*b* or base station 105-*b* may generate a first joint codebook based on the first codebook associated with the first matrix and the first codebook of the set of second codebooks. Additionally, UE 115-*b* or base station 105-*b* may generate a second joint codebook based on the first codebook associated with the first matrix and the second codebook of the set of second codebooks.

At 735, UE 115-*b* may transmit the first portion of the payload using one or more sequences associated with the first matrix and the second portion of the payload using one or more sequences associated with the second matrix. Base station 105-*b* may receive the first portion of the payload using the one or more sequences associated with the first matrix and the second portion of the payload using the one or more sequences associated with the second matrix.

In some examples, transmitting the second portion of the payload may involve transmitting a first subset of the second portion of the payload using a first sequence from a first codebook of the set of second codebooks and a second subset of the second portion of the payload using a second sequence from a second codebook of the set of second codebooks. Similarly, base station 105-*b* may receive the first subset using the first sequence and the second subset using the second sequence. In some examples, UE 115-*b* may transmit the first subset over a first frequency portion associate with a frequency hopping configuration and the second subset of the second portion of the payload using a second frequency portion associated with the frequency hopping configuration. Base station 105-*b* may receive the first subset of the second portion over the first frequency portion and the second subset of the second portion over the second frequency portion. In some examples, UE 115-*b* may transmit the first portion of the payload over the first frequency portion using an encoding scheme and the first portion of the payload over second frequency portion using the encoding scheme. Base station 105-*b* may receive the first portion of the payload over the first frequency portion using the encoding scheme and the second portion of the payload over the second frequency portion using the encoding scheme. The encoding scheme may be a repetition coding scheme, a Reed-Muller encoding scheme, a polar encoding scheme, or a combination thereof.

In some examples, at 735, UE 115-*b* may transmit the first portion of the payload over the first frequency portion and the first subset of the second portion of the payload using the first joint codebook. Similarly, at 735, base station 105-*b* may receive the first portion of the payload over the first frequency portion and the first subset of the second portion of the payload using the first joint codebook. In some examples, at 735, UE 115-*b* may transmit the first portion of the payload over the second frequency portion and the second subset of the second portion of the payload using the second joint codebook. Similarly, at 735, base station 105-*b* may receive the first portion of the payload over the second frequency portion and the second subset of the second portion of the payload using the second joint codebook.

In some examples, the configuration signaling at 705 may, additionally or alternatively, indicate an ordering of the first subset of the second portion of the payload and the first portion of the payload over the first frequency portion and an ordering of the second subset of the second portion of the payload and the first portion of the payload over the second frequency portion. For instance, the ordering of the first subset of the second portion of the payload and the first portion of the payload over the first frequency portion may indicate that the first portion of the payload over the first frequency portion is ordered before the first subset of the second portion of the payload. The ordering of the second subset of the second portion of the payload and the first portion of the payload over the second frequency portion may indicate that the first portion of the payload over the second frequency portion is ordered before the second subset of the second portion of the payload. In some examples, the configuration signaling at 705 may, additionally or alternatively, indicate a mapping between the first portion of the payload and the first matrix. The configuration signaling may additionally indicate a mapping between the second portion of the payload and the second matrix.

Figure 8:
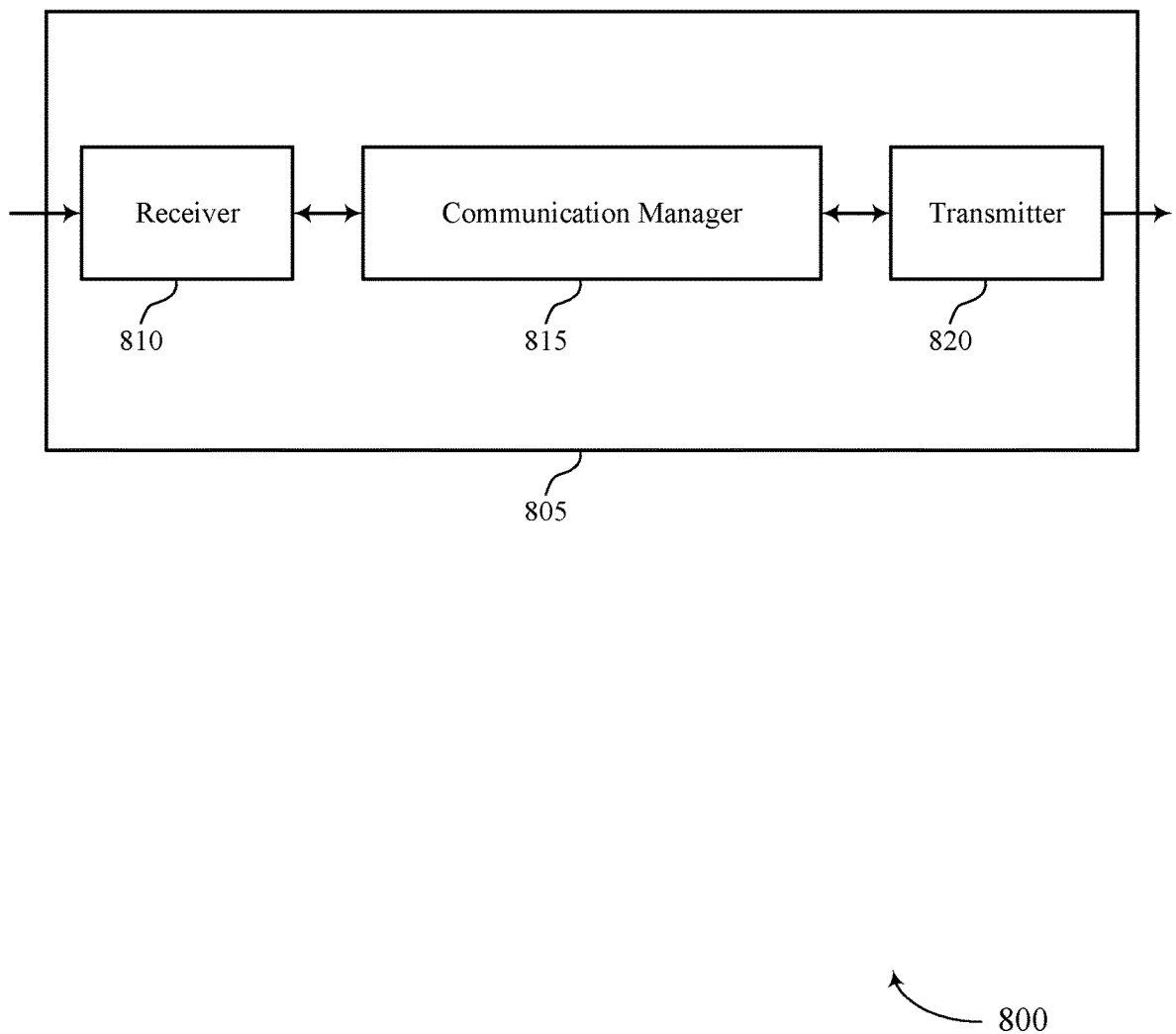
FIGS. 8 and 9 show block diagrams of devices that support payload multiplexing with orthogonal sequences in accordance with aspects of the present disclosure.

FIG. 8 shows a block diagram 800 of a device 805 that supports payload multiplexing with orthogonal sequences in accordance with aspects of the present disclosure. The device 805 may be an example of aspects of a UE 115 as described herein. The device 805 may include a receiver 810, a communication manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to payload multiplexing with orthogonal sequences, etc.). Information may be passed on to other components of the device 805. The receiver 810 may be an example of aspects of the transceiver 1115 described with reference to FIG. 11. The receiver 810 may utilize a single antenna or a set of antennas.

The communication manager 815 may identify a first portion of a payload and a second portion of the payload, where the first portion of the payload is associated with a first priority and the second portion of the payload is associated with a second priority that is less than the first priority, select a first matrix associated with a first domain for transmitting the first portion of the payload and a second matrix associated with a second domain for transmitting the second portion of the payload based on a first maximum index interval for the first matrix being larger than a second maximum index interval for the second matrix, and transmit the first portion of the payload using one or more sequences associated with the first matrix and the second portion of the payload using one or more sequences associated with the second matrix. The communication manager 815 may be an example of aspects of the communication manager 1110 described herein.

The communication manager 815, or its sub-components, may be implemented in hardware, code (e.g., software or firmware) executed by a processor, or any combination thereof. If implemented in code executed by a processor, the functions of the communication manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 815, or its sub-components, may be physically located at various positions, including being distributed such that portions of functions are implemented at different physical locations by one or more physical components. In some examples, the communication manager 815, or its sub-components, may be a separate and distinct component in accordance with various aspects of the present disclosure. In some examples, the communication manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1115 described with reference to FIG. 11. The transmitter 820 may utilize a single antenna or a set of antennas.

Figure 9:
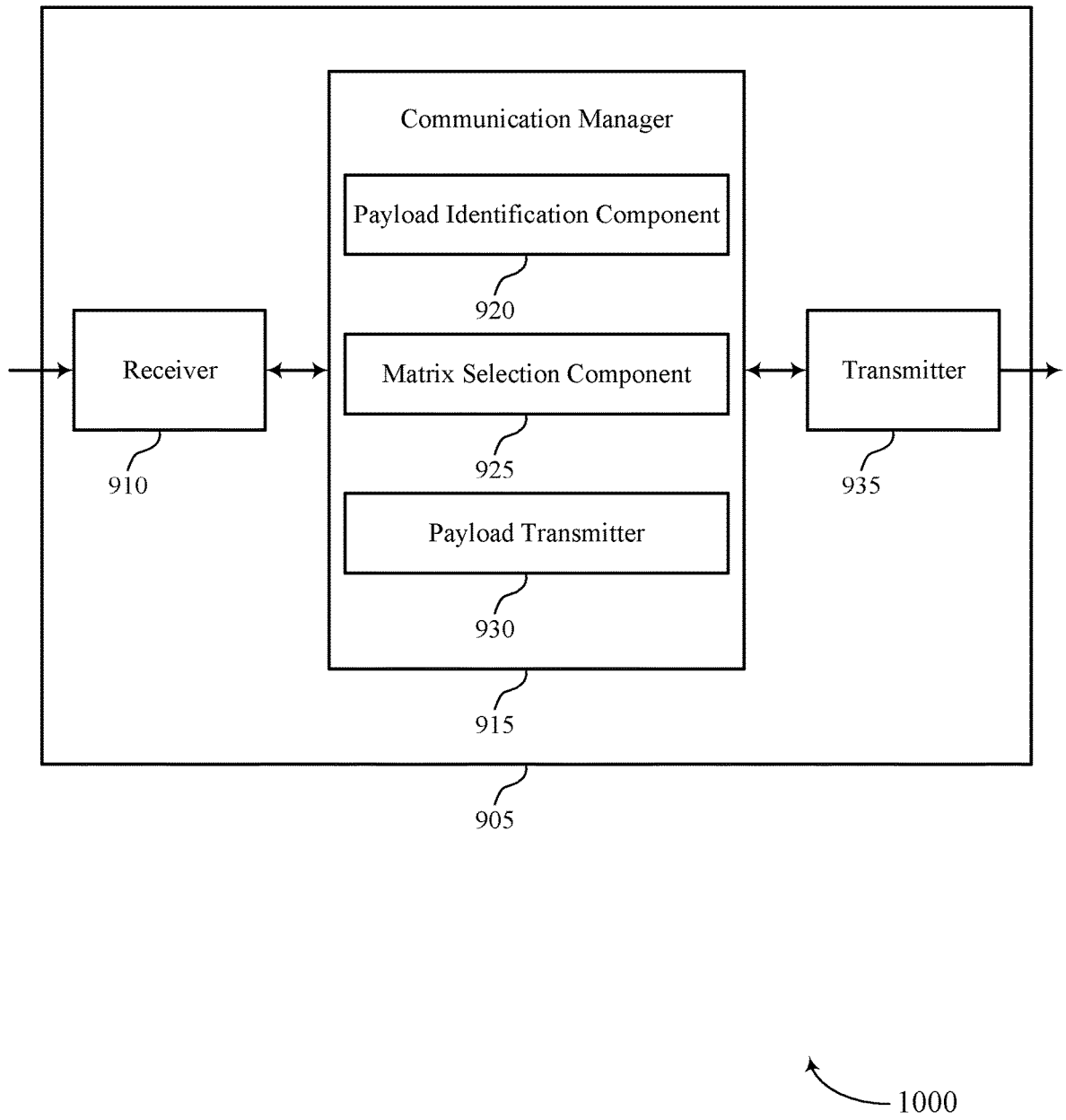

FIG. 9 shows a block diagram 900 of a device 905 that supports payload multiplexing with orthogonal sequences in accordance with aspects of the present disclosure. The device 905 may be an example of aspects of a device 805, or a UE 115 as described herein. The device 905 may include a receiver 910, a communication manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to payload multiplexing with orthogonal sequences, etc.). Information may be passed on to other components of the device 905. The receiver 910 may be an example of aspects of the transceiver 1115 described with reference to FIG. 11. The receiver 910 may utilize a single antenna or a set of antennas.

The communication manager 915 may be an example of aspects of the communication manager 815 as described herein. The communication manager 915 may include a payload identification component 920, a matrix selection component 925, and a payload transmitter 930. The communication manager 915 may be an example of aspects of the communication manager 1110 described herein.

The payload identification component 920 may identify a first portion of a payload and a second portion of the payload, where the first portion of the payload is associated with a first priority and the second portion of the payload is associated with a second priority that is less than the first priority.

The matrix selection component 925 may select a first matrix associated with a first domain for transmitting the first portion of the payload and a second matrix associated with a second domain for transmitting the second portion of the payload based on a first maximum index interval for the first matrix being larger than a second maximum index interval for the second matrix.

The payload transmitter 930 may transmit the first portion of the payload using one or more sequences associated with the first matrix and the second portion of the payload using one or more sequences associated with the second matrix.

The transmitter 935 may transmit signals generated by other components of the device 905. In some examples, the transmitter 935 may be collocated with a receiver 910 in a transceiver module. For example, the transmitter 935 may be an example of aspects of the transceiver 1115 described with reference to FIG. 11. The transmitter 935 may utilize a single antenna or a set of antennas.

Figure 10:
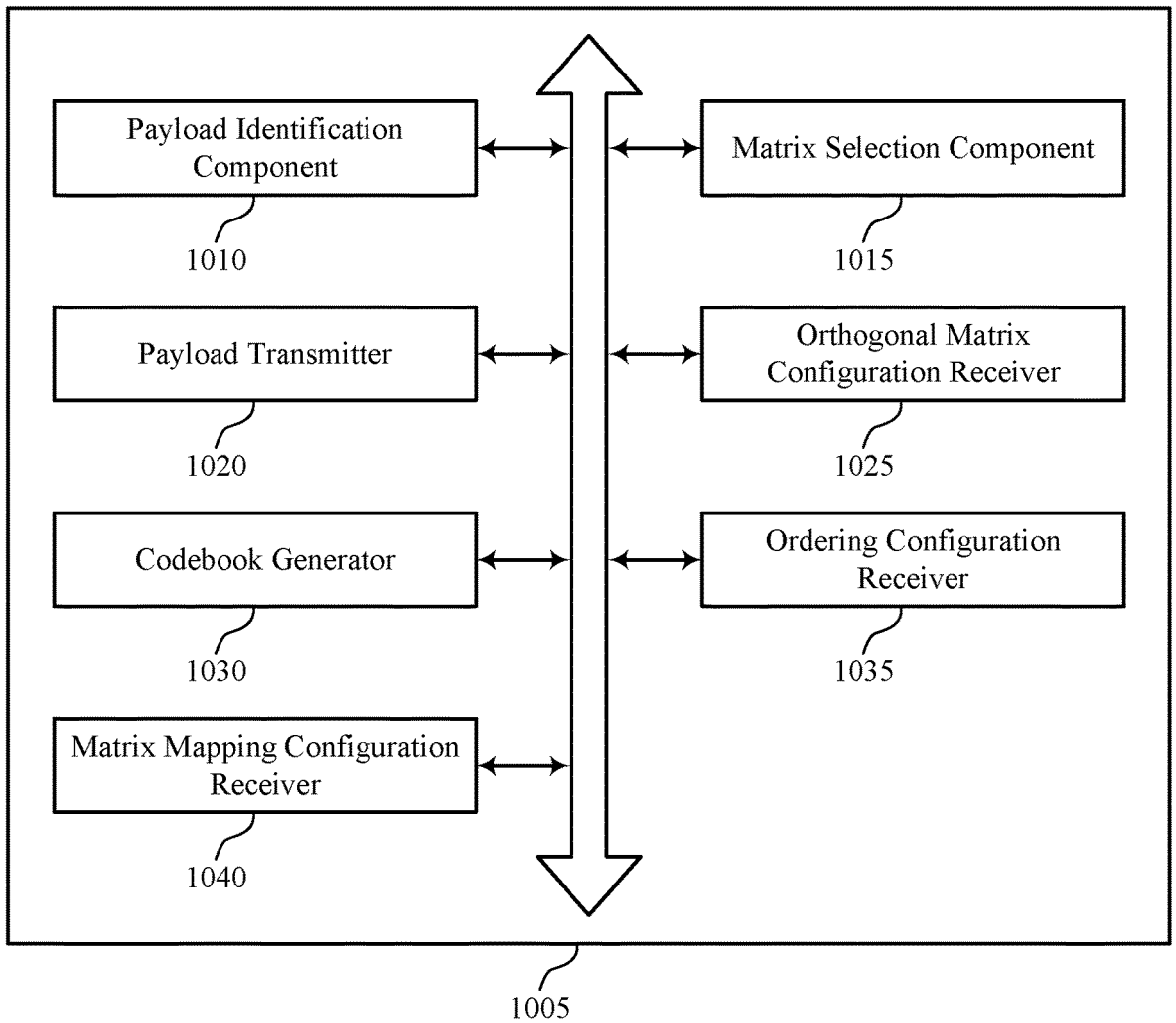
FIG. 10 shows a block diagram of a communication manager that supports payload multiplexing with orthogonal sequences in accordance with aspects of the present disclosure.

FIG. 10 shows a block diagram 1000 of a communication manager 1005 that supports payload multiplexing with orthogonal sequences in accordance with aspects of the present disclosure. The communication manager 1005 may be an example of aspects of a communication manager 815, a communication manager 915, or a communication manager 1110 described herein. The communication manager 1005 may include a payload identification component 1010, a matrix selection component 1015, a payload transmitter 1020, an orthogonal matrix configuration receiver 1025, a codebook generator 1030, an ordering configuration receiver 1035, and a matrix mapping configuration receiver 1040. Each of these modules may communicate, directly or indirectly, with one another (e.g., via one or more buses).

The payload identification component 1010 may identify a first portion of a payload and a second portion of the payload, where the first portion of the payload is associated with a first priority and the second portion of the payload is associated with a second priority that is less than the first priority. In some cases, the first portion of the payload includes feedback process information and the second portion of the payload includes channel state information.

The matrix selection component 1015 may select a first matrix associated with a first domain for transmitting the first portion of the payload and a second matrix associated with a second domain for transmitting the second portion of the payload based on a first maximum index interval for the first matrix being larger than a second maximum index interval for the second matrix. In some cases, the first maximum index interval is based on a size of the first matrix and a first number of bits associated with the first portion of the payload. In some cases, the second maximum index interval is based on a size of the second matrix and a second number of bits associated with the second portion of the payload.

The payload transmitter 1020 may transmit the first portion of the payload using one or more sequences associated with the first matrix and the second portion of the payload using one or more sequences associated with the second matrix. In some examples, the payload transmitter 1020 may transmit a first subset of the second portion of the payload using a first sequence from a first codebook of the set of second codebooks and a second subset of the second portion of the payload using a second sequence from a second codebook of the set of second codebooks. In some examples, the payload transmitter 1020 may transmit the first subset of the second portion of the payload over a first frequency portion associated with a frequency hopping configuration and the second portion of the payload using a second frequency portion associated with the frequency hopping configuration. In some examples, the payload transmitter 1020 may transmit the first portion of the payload over the first frequency portion using an encoding scheme and the first portion of the payload over the second frequency portion using the encoding scheme. The encoding scheme may be a repetition coding scheme, a Reed-Muller encoding scheme, a polar encoding scheme, or a combination thereof. The first portion of the payload may be associated with a higher reliability requirement than the second portion of the payload.

The orthogonal matrix configuration receiver 1025 may receive configuration signaling indicating a parameter for generating a set of orthogonal matrices based on the second matrix, where a size of each orthogonal matrix of the set of orthogonal matrices is based on a value of the parameter. The codebook generator 1030 may generate a first codebook associated with the first matrix, where codepoints of the first codebook are based on the first maximum index interval. In some examples, the codebook generator 1030 may generate a set of second codebooks based on the set of orthogonal matrices, where codepoints of the set of second codebooks are based on a maximum index interval for each of the set of orthogonal matrices. In some examples, the codebook generator 1030 may generate a joint codebook based on the first codebook associated with the first matrix and the first codebook of the set of second codebooks, where the first portion of the payload over the first frequency portion and the first subset of the second portion of the payload are transmitted using the joint codebook.

The ordering configuration receiver 1035 may receive configuration signaling indicating an ordering of the first subset of the second portion of the payload and the first portion of the payload over the first frequency portion and an ordering of the second subset of the second portion of the payload and the first portion of the payload over the second frequency portion. In some examples, the ordering of the first subset of the second portion of the payload and the first portion of the payload over the first frequency portion indicates that the first portion of the payload over the first frequency portion is ordered before the first subset of the second portion of the payload. In some examples, the ordering of the second subset of the second portion of the payload and the first portion of the payload over the second frequency portion indicates that the first portion of the payload over the second frequency portion is ordered before the second subset of the second portion of the payload.

The matrix mapping configuration receiver 1040 may receive configuration signaling indicating a mapping between the first portion of the payload and the first matrix and a mapping between the second portion of the payload and the second matrix.

Figure 11:
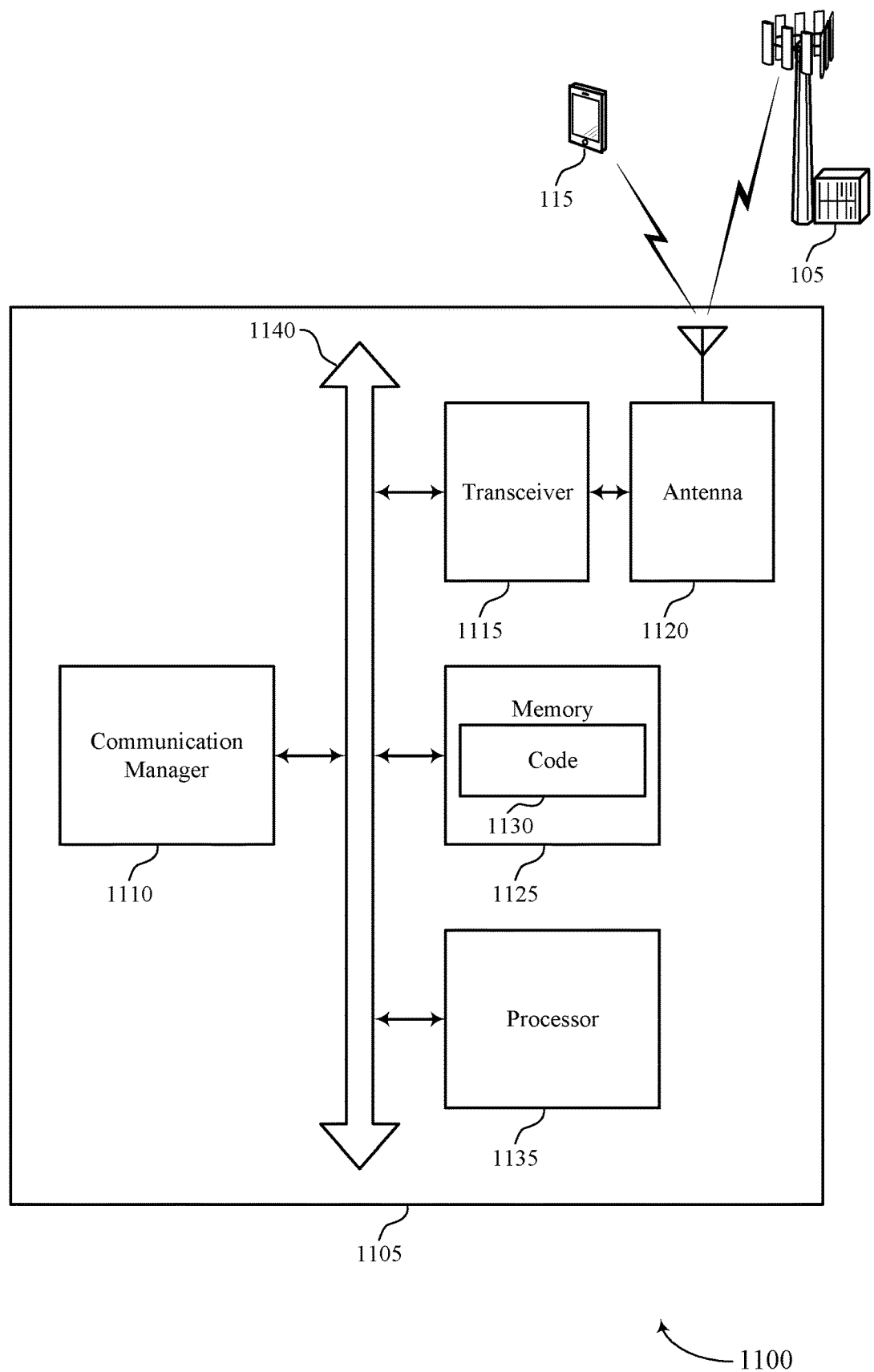
FIG. 11 shows a diagram of a system including a device that supports payload multiplexing with orthogonal sequences in accordance with aspects of the present disclosure.

FIG. 11 shows a diagram of a system 1100 including a device 1105 that supports payload multiplexing with orthogonal sequences in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communication manager 1110, a transceiver 1115, an antenna 1120, memory 1125, and a processor 1135. These components may be in electronic communication via one or more buses (e.g., bus 1140).

The communication manager 1110 may identify a first portion of a payload and a second portion of the payload, where the first portion of the payload is associated with a first priority and the second portion of the payload is associated with a second priority that is less than the first priority, select a first matrix associated with a first domain for transmitting the first portion of the payload and a second matrix associated with a second domain for transmitting the second portion of the payload based on a first maximum index interval for the first matrix being larger than a second maximum index interval for the second matrix, and transmit the first portion of the payload using one or more sequences associated with the first matrix and the second portion of the payload using one or more sequences associated with the second matrix.

The transceiver 1115 may communicate bi-directionally, via one or more antennas, wired, or wireless links as described above. For example, the transceiver 1115 may represent a wireless transceiver and may communicate bi-directionally with another wireless transceiver. The transceiver 1115 may also include a modem to modulate the packets and provide the modulated packets to the antennas for transmission, and to demodulate packets received from the antennas.

In some cases, the wireless device may include a single antenna 1120. However, in some cases the device may have more than one antenna 1120, which may be capable of concurrently transmitting or receiving multiple wireless transmissions.

The memory 1125 may include random-access memory (RAM) and read-only memory (ROM). The memory 1125 may store computer-readable, computer-executable code 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

The code 1130 may include instructions to implement aspects of the present disclosure, including instructions to support wireless communications. The code 1130 may be stored in a non-transitory computer-readable medium such as system memory or other type of memory. In some cases, the code 1130 may not be directly executable by the processor 1135 but may cause a computer (e.g., when compiled and executed) to perform functions described herein.

The processor 1135 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1135 may be configured to operate a memory array using a memory controller. In other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting payload multiplexing with orthogonal sequences).

Figure 12:
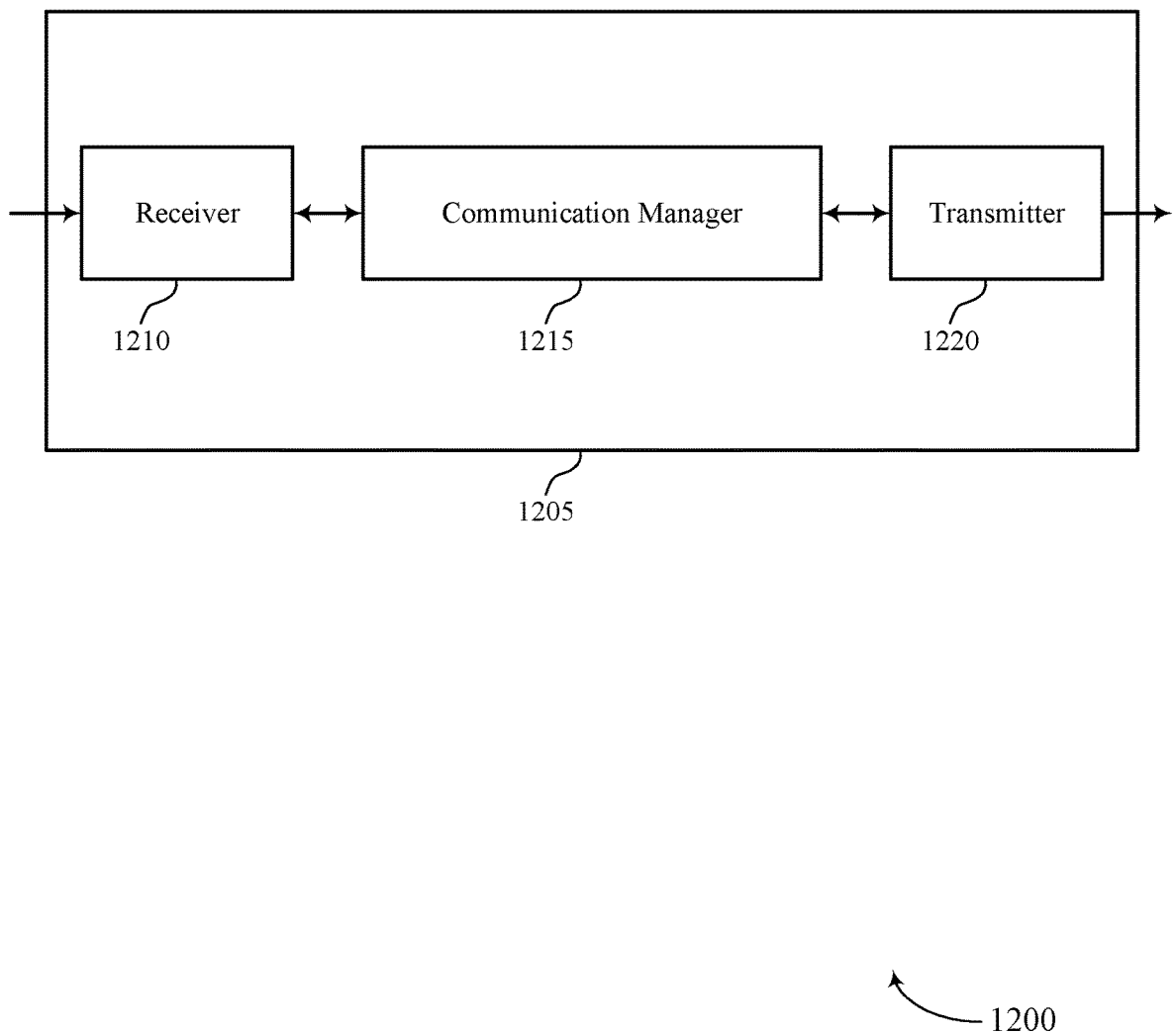
FIGS. 12 and 13 show block diagrams of devices that support payload multiplexing with orthogonal sequences in accordance with aspects of the present disclosure.

FIG. 12 shows a block diagram 1200 of a device 1205 that supports payload multiplexing with orthogonal sequences in accordance with aspects of the present disclosure. The device 1205 may be an example of aspects of a base station 105 as described herein. The device 1205 may include a receiver 1210, a communication manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to payload multiplexing with orthogonal sequences, etc.). Information may be passed on to other components of the device 1205. The receiver 1210 may be an example of aspects of the transceiver 1520 described with reference to FIG. 15. The receiver 1210 may utilize a single antenna or a set of antennas.

The communication manager 1215 may identify a first portion of a payload and a second portion of the payload, where the first portion of the payload is associated with a first priority and the second portion of the payload is associated with a second priority that is less than the first priority, select a first matrix associated with a first domain for transmitting the first portion of the payload and a second matrix associated with a second domain for transmitting the second portion of the payload based on a first maximum index interval for the first matrix being larger than a second maximum index interval for the second matrix, and receive the first portion of the payload using one or more sequences associated with the first matrix and the second portion of the payload using one or more sequences associated with the second matrix. The communication manager 1215 may be an example of aspects of the communication manager 1510 described herein.

The communication manager 1215, or its sub-components, may be implemented in hardware, code (e.g., software or firmware) executed by a processor, or any combination thereof. If implemented in code executed by a processor, the functions of the communication manager 1215, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communication manager 1215, or its sub-components, may be physically located at various positions, including being distributed such that portions of functions are implemented at different physical locations by one or more physical components. In some examples, the communication manager 1215, or its sub-components, may be a separate and distinct component in accordance with various aspects of the present disclosure. In some examples, the communication manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
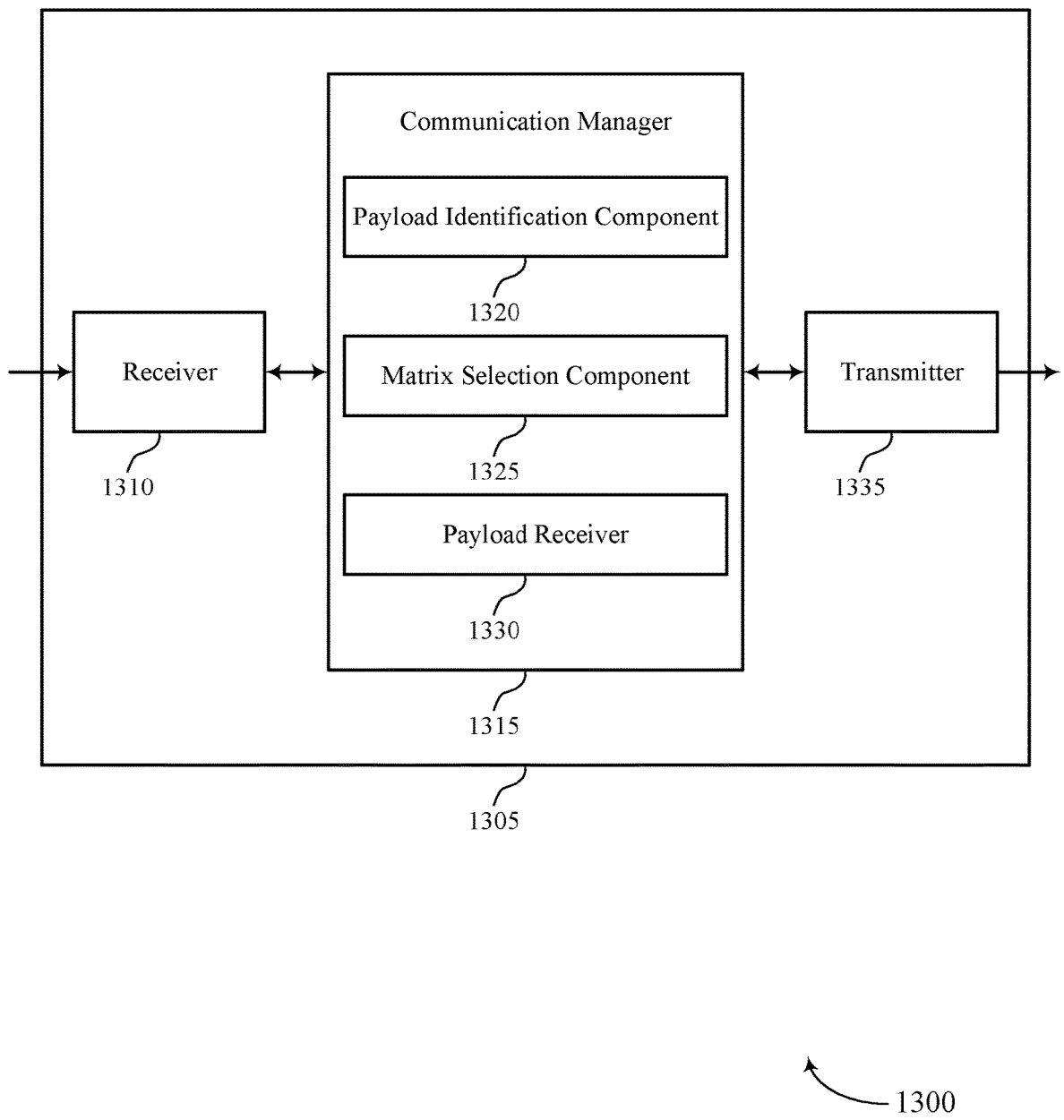

FIG. 13 shows a block diagram 1300 of a device 1305 that supports payload multiplexing with orthogonal sequences in accordance with aspects of the present disclosure. The device 1305 may be an example of aspects of a device 1205, or a base station 105 as described herein. The device 1305 may include a receiver 1310, a communication manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to payload multiplexing with orthogonal sequences, etc.). Information may be passed on to other components of the device 1305. The receiver 1310 may be an example of aspects of the transceiver 1520 described with reference to FIG. 15. The receiver 1310 may utilize a single antenna or a set of antennas.

The communication manager 1315 may be an example of aspects of the communication manager 1215 as described herein. The communication manager 1315 may include a payload identification component 1320, a matrix selection component 1325, and a payload receiver 1330. The communication manager 1315 may be an example of aspects of the communication manager 1510 described herein.

The payload identification component 1320 may identify a first portion of a payload and a second portion of the payload, where the first portion of the payload is associated with a first priority and the second portion of the payload is associated with a second priority that is less than the first priority.

The matrix selection component 1325 may select a first matrix associated with a first domain for transmitting the first portion of the payload and a second matrix associated with a second domain for transmitting the second portion of the payload based on a first maximum index interval for the first matrix being larger than a second maximum index interval for the second matrix.

The payload receiver 1330 may receive the first portion of the payload using one or more sequences associated with the first matrix and the second portion of the payload using one or more sequences associated with the second matrix.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
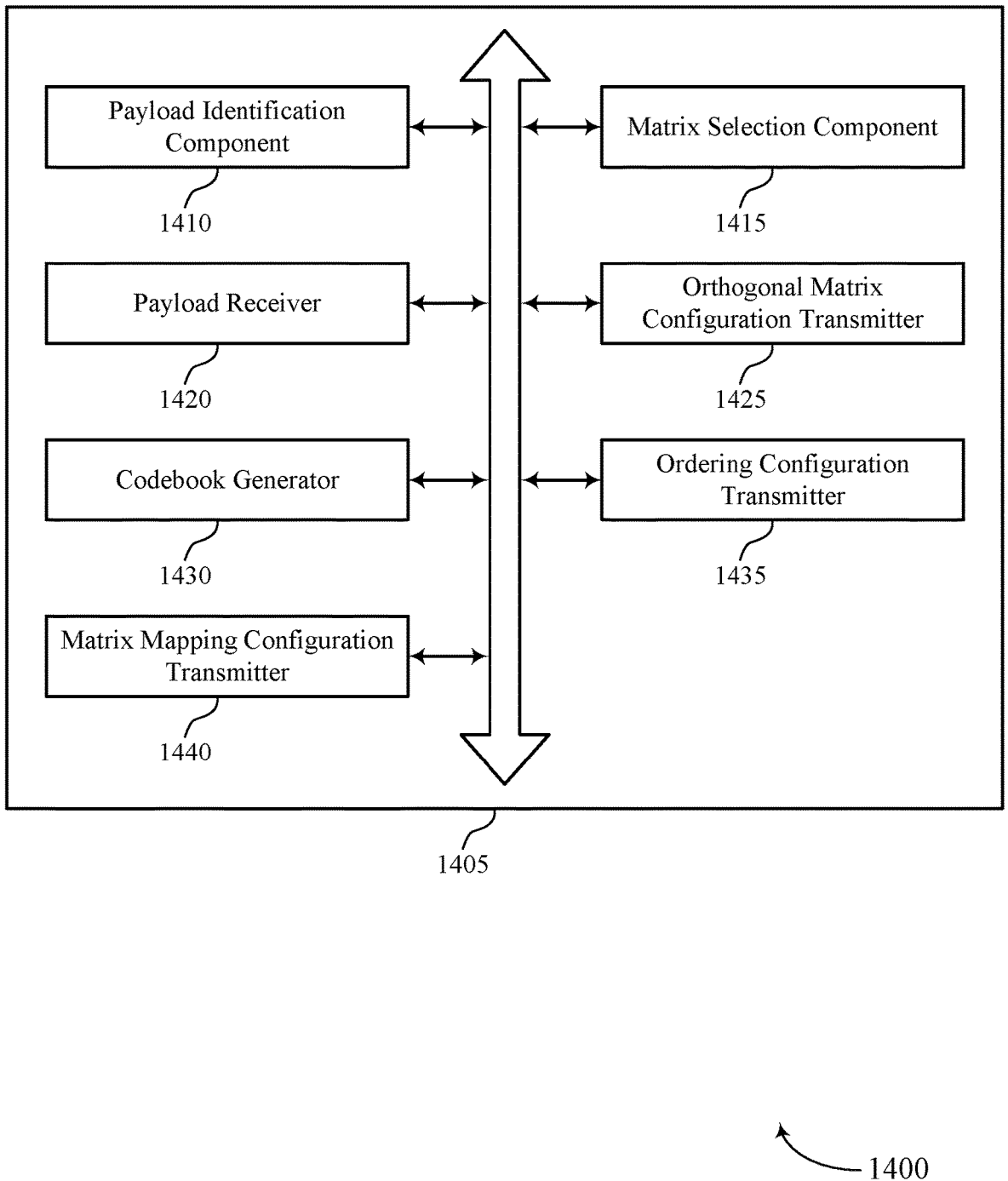
FIG. 14 shows a block diagram of a communication manager that supports payload multiplexing with orthogonal sequences in accordance with aspects of the present disclosure.

FIG. 14 shows a block diagram 1400 of a communication manager 1405 that supports payload multiplexing with orthogonal sequences in accordance with aspects of the present disclosure. The communication manager 1405 may be an example of aspects of a communication manager 1215, a communication manager 1315, or a communication manager 1510 described herein. The communication manager 1405 may include a payload identification component 1410, a matrix selection component 1415, a payload receiver 1420, an orthogonal matrix configuration transmitter 1425, a codebook generator 1430, an ordering configuration transmitter 1435, and a matrix mapping configuration transmitter 1440. Each of these modules may communicate, directly or indirectly, with one another (e.g., via one or more buses).

The payload identification component 1410 may identify a first portion of a payload and a second portion of the payload, where the first portion of the payload is associated with a first priority and the second portion of the payload is associated with a second priority that is less than the first priority. In some cases, the first portion of the payload includes feedback process information and the second portion of the payload includes channel state information.

The matrix selection component 1415 may select a first matrix associated with a first domain for transmitting the first portion of the payload and a second matrix associated with a second domain for transmitting the second portion of the payload based on a first maximum index interval for the first matrix being larger than a second maximum index interval for the second matrix. In some cases, the first maximum index interval is based on a size of the first matrix and a first number of bits associated with the first portion of a payload. In some cases, the second maximum index interval is based on a size of the second matrix and a second number of bits associated with the second portion of a payload.

The payload receiver 1420 may receive the first portion of the payload using one or more sequences associated with the first matrix and the second portion of the payload using one or more sequences associated with the second matrix. In some examples, the payload receiver 1420 may receive a first subset of the second portion of the payload using a first sequence from a first codebook of the set of second codebooks and a second subset of the second portion of the payload using a second sequence from a second codebook of the set of second codebooks. In some examples, the payload receiver 1420 may receive the first subset of the second portion of the payload over a first frequency portion associated with a frequency hopping configuration and the second portion of the payload using a second frequency portion associated with the frequency hopping configuration. In some examples, the payload receiver 1420 may receive the first portion of the payload over the first frequency portion using an encoding scheme and the first portion of the payload over the second frequency portion using the encoding scheme. The encoding scheme may be a repetition coding scheme, a Reed-Muller encoding scheme, a polar encoding scheme, or a combination thereof. In some examples, the first portion of the payload may be associated with a higher reliability requirement than the second portion of the payload.

The orthogonal matrix configuration transmitter 1425 may transmit configuration signaling indicating a parameter for generating a set of orthogonal matrices based on the second matrix, where a size of each orthogonal matrix of the set of orthogonal matrices is based on a value of the parameter.

The codebook generator 1430 may generate a first codebook associated with the first matrix, where codepoints of the first codebook are based on the first maximum index interval. In some examples, the codebook generator 1430 may generate a set of second codebooks based on the set of orthogonal matrices, where codepoints of the set of second codebooks are based on a maximum index interval for each of the set of orthogonal matrices. In some examples, the codebook generator 1430 may generate a joint codebook based on the first codebook associated with the first matrix and the first codebook of the set of second codebooks, where the first the first portion of the payload over the first frequency portion and the first subset of the second portion of the payload are received using the joint codebook.

The ordering configuration transmitter 1435 may transmit configuration signaling indicating an ordering of the first subset of the second portion of the payload and the first portion of the payload over the first frequency portion and an ordering of the second subset of the second portion of the payload and the first portion of the payload over the second frequency portion. In some examples, the ordering of the first subset of the second portion of the payload and the first portion of the payload over the first frequency portion indicates that the first portion of the payload over the first frequency portion is ordered before the first subset of the second portion of the payload. In some examples, the ordering of the second subset of the second portion of the payload and the first portion of the payload over the second frequency portion indicates that the first portion of the payload over the second frequency portion is ordered before the second subset of the second portion of the payload.

The matrix mapping configuration transmitter 1440 may transmit configuration signaling indicating a mapping between the first portion of the payload and the first matrix and a mapping between the second portion of the payload and the second matrix.

Figure 15:
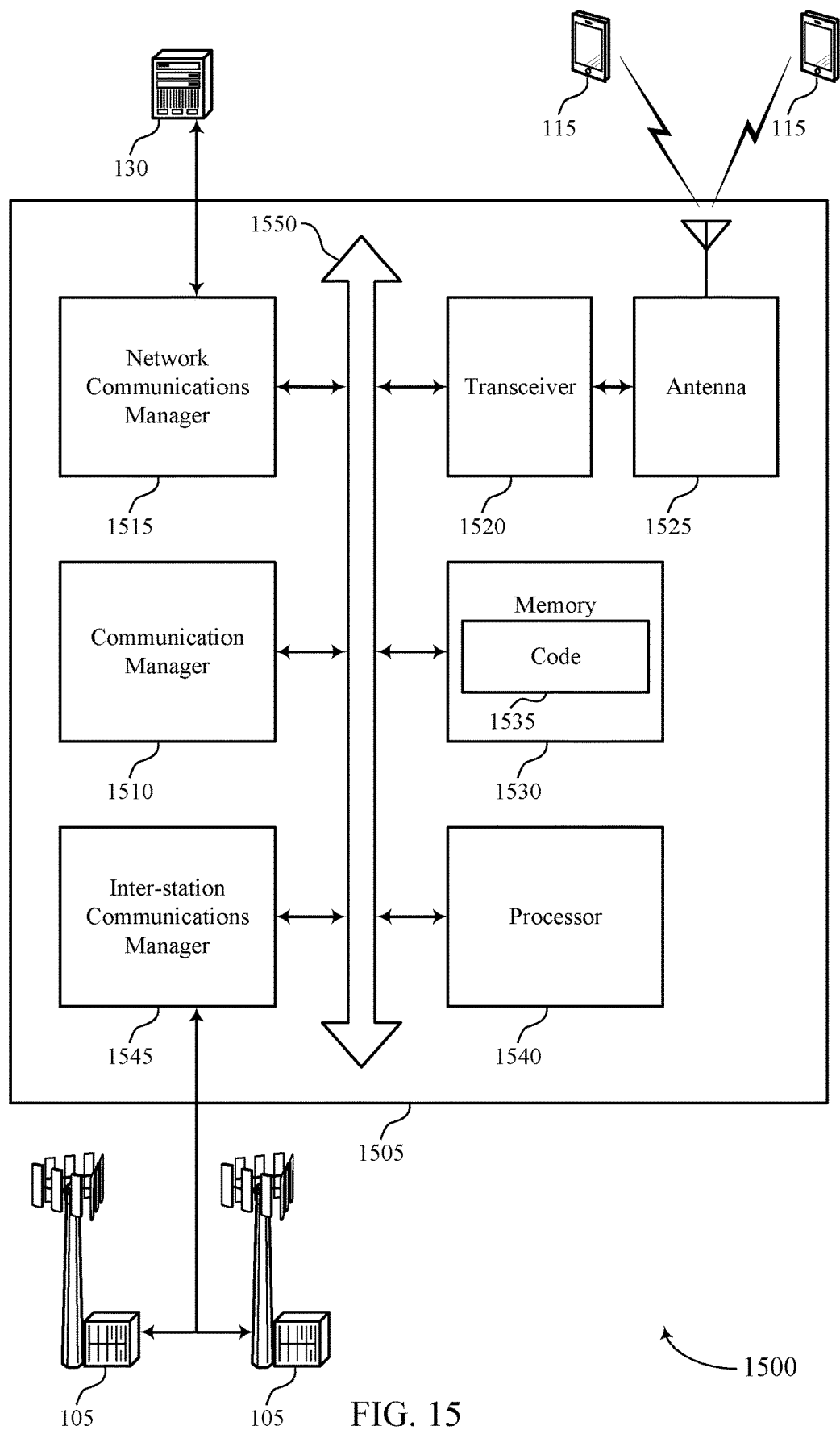
FIG. 15 shows a diagram of a system including a device that supports payload multiplexing with orthogonal sequences in accordance with aspects of the present disclosure.

FIG. 15 shows a diagram of a system 1500 including a device 1505 that supports payload multiplexing with orthogonal sequences in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communication manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communication manager 1510 may identify a first portion of a payload and a second portion of the payload, where the first portion of the payload is associated with a first priority and the second portion of the payload is associated with a second priority that is less than the first priority, select a first matrix associated with a first domain for transmitting the first portion of the payload and a second matrix associated with a second domain for transmitting the second portion of the payload based on a first maximum index interval for the first matrix being larger than a second maximum index interval for the second matrix, and receive the first portion of the payload using one or more sequences associated with the first matrix and the second portion of the payload using one or more sequences associated with the second matrix.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM and ROM. The memory 1530 may store computer-readable, computer-executable code 1535 including instructions that, when executed, cause the processor to perform various functions described herein. In some cases, the memory 1530 may contain, among other things, a BIOS which may control basic hardware or software operation such as the interaction with peripheral components or devices.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting payload multiplexing with orthogonal sequences).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

Figure 16:
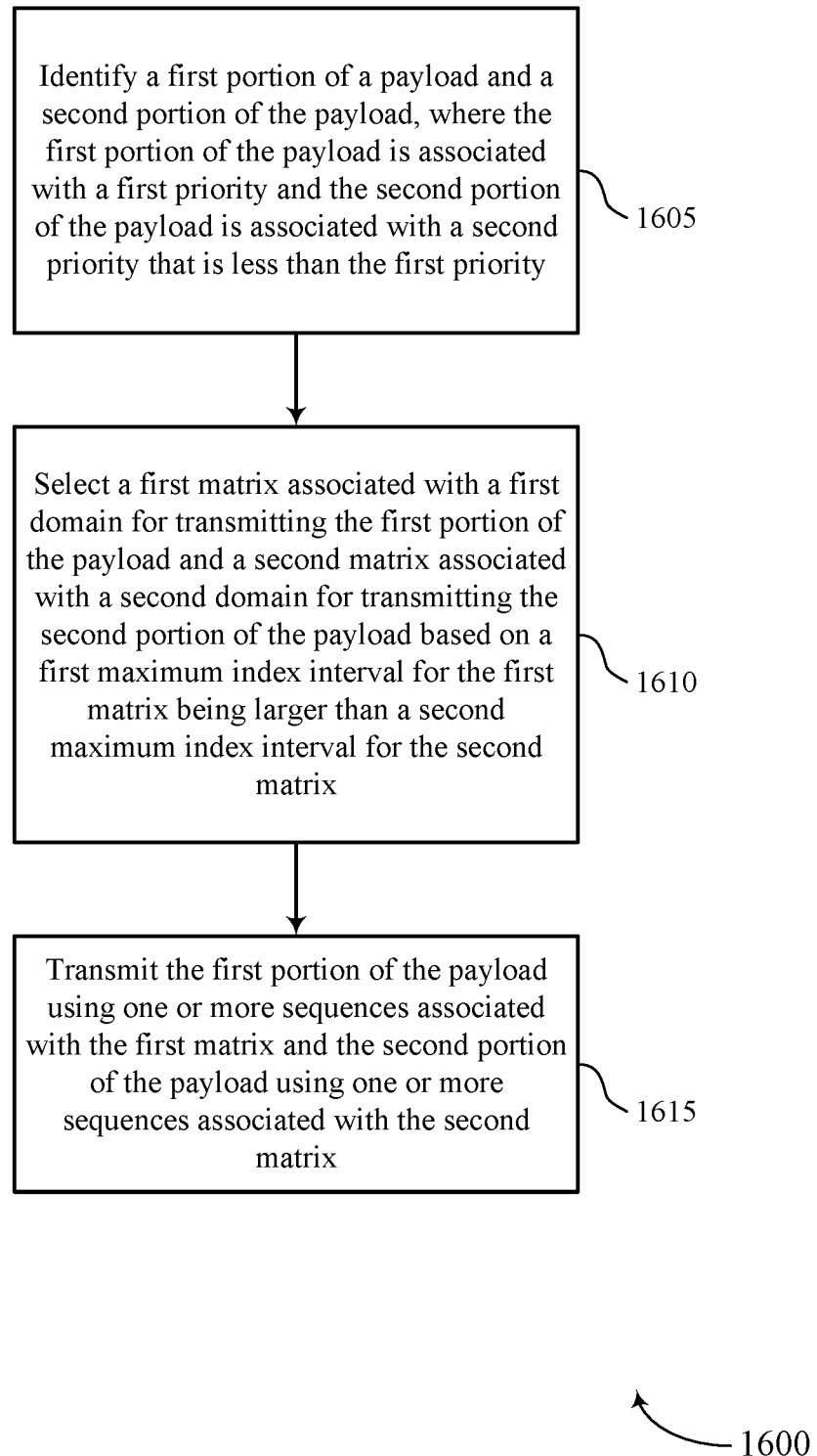
FIGS. 16 through 19 show flowcharts illustrating methods that support payload multiplexing with orthogonal sequences in accordance with aspects of the present disclosure.

FIG. 16 shows a flowchart illustrating a method 1600 that supports payload multiplexing with orthogonal sequences in accordance with aspects of the present disclosure. The operations of method 1600 may be implemented by a UE 115 or its components as described herein. For example, the operations of method 1600 may be performed by a communication manager as described with reference to FIGS. 8 through 11. In some examples, a UE may execute a set of instructions to control the functional elements of the UE to perform the described functions. Additionally or alternatively, a UE may perform aspects of the described functions using special-purpose hardware.

At 1605, the UE may identify a first portion of a payload and a second portion of the payload, where the first portion of the payload is associated with a first priority and the second portion of the payload is associated with a second priority that is less than the first priority. The operations of 1605 may be performed according to the methods described herein. In some examples, aspects of the operations of 1605 may be performed by a payload identification component as described with reference to FIGS. 8 through 11.

At 1610, the UE may select a first matrix associated with a first domain for transmitting the first portion of the payload and a second matrix associated with a second domain for transmitting the second portion of the payload based on a first maximum index interval for the first matrix being larger than a second maximum index interval for the second matrix. The operations of 1610 may be performed according to the methods described herein. In some examples, aspects of the operations of 1610 may be performed by a matrix selection component as described with reference to FIGS. 8 through 11.

At 1615, the UE may transmit the first portion of the payload using one or more sequences associated with the first matrix and the second portion of the payload using one or more sequences associated with the second matrix. The operations of 1615 may be performed according to the methods described herein. In some examples, aspects of the operations of 1615 may be performed by a payload transmitter as described with reference to FIGS. 8 through 11.

Figure 17:
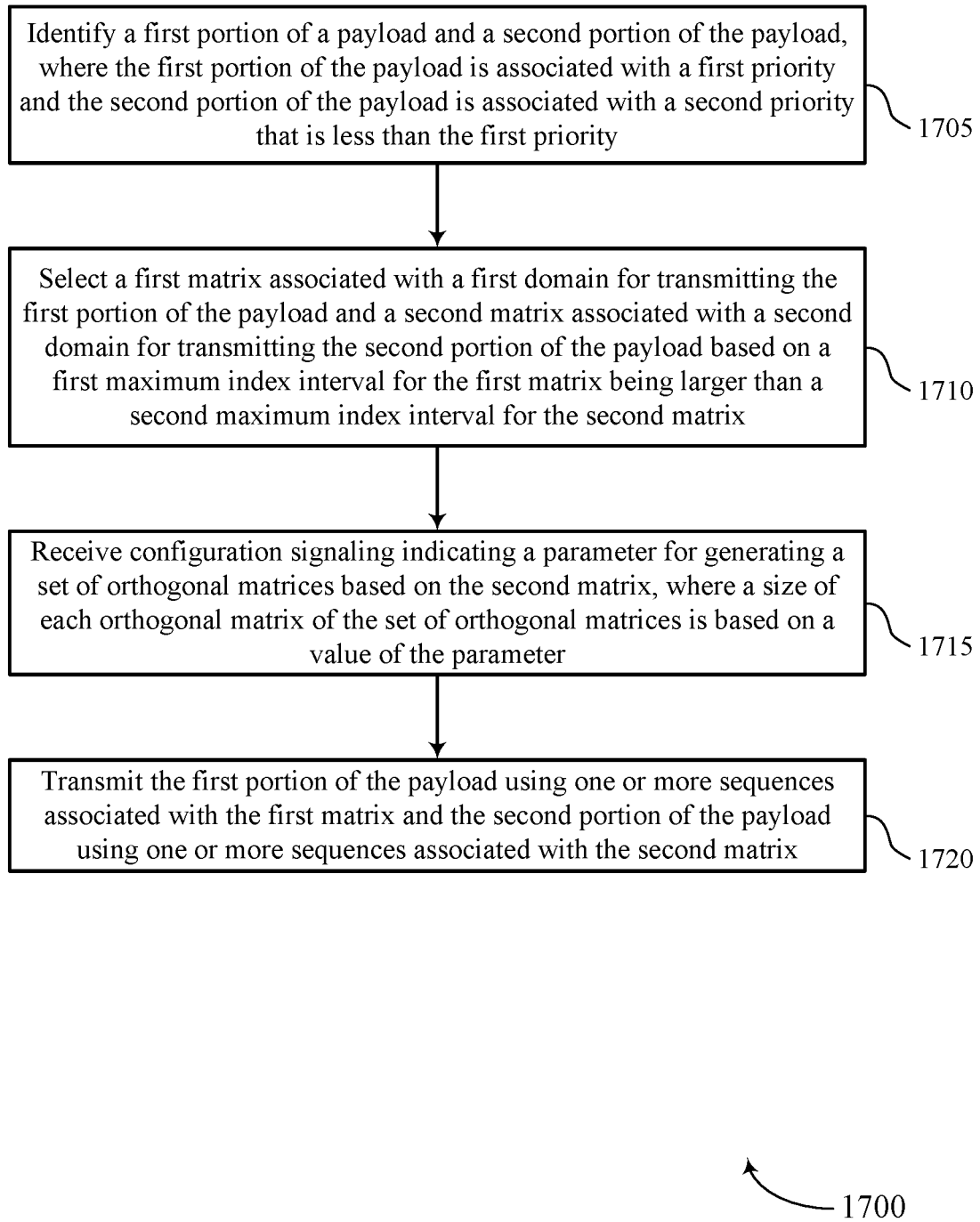

FIG. 17 shows a flowchart illustrating a method 1700 that supports payload multiplexing with orthogonal sequences in accordance with aspects of the present disclosure. The operations of method 1700 may be implemented by a UE 115 or its components as described herein. For example, the operations of method 1700 may be performed by a communication manager as described with reference to FIGS. 8 through 11. In some examples, a UE may execute a set of instructions to control the functional elements of the UE to perform the described functions. Additionally or alternatively, a UE may perform aspects of the described functions using special-purpose hardware.

At 1705, the UE may identify a first portion of a payload and a second portion of the payload, where the first portion of the payload is associated with a first priority and the second portion of the payload is associated with a second priority that is less than the first priority. The operations of 1705 may be performed according to the methods described herein. In some examples, aspects of the operations of 1705 may be performed by a payload identification component as described with reference to FIGS. 8 through 11.

At 1710, the UE may select a first matrix associated with a first domain for transmitting the first portion of the payload and a second matrix associated with a second domain for transmitting the second portion of the payload based on a first maximum index interval for the first matrix being larger than a second maximum index interval for the second matrix. The operations of 1710 may be performed according to the methods described herein. In some examples, aspects of the operations of 1710 may be performed by a matrix selection component as described with reference to FIGS. 8 through 11.

At 1715, the UE may receive configuration signaling indicating a parameter for generating a set of orthogonal matrices based on the second matrix, where a size of each orthogonal matrix of the set of orthogonal matrices is based on a value of the parameter. The operations of 1715 may be performed according to the methods described herein. In some examples, aspects of the operations of 1715 may be performed by an orthogonal matrix configuration receiver as described with reference to FIGS. 8 through 11.

At 1720, the UE may transmit the first portion of the payload using one or more sequences associated with the first matrix and the second portion of the payload using one or more sequences associated with the second matrix. The operations of 1720 may be performed according to the methods described herein. In some examples, aspects of the operations of 1720 may be performed by a payload transmitter as described with reference to FIGS. 8 through 11.

Figure 18:
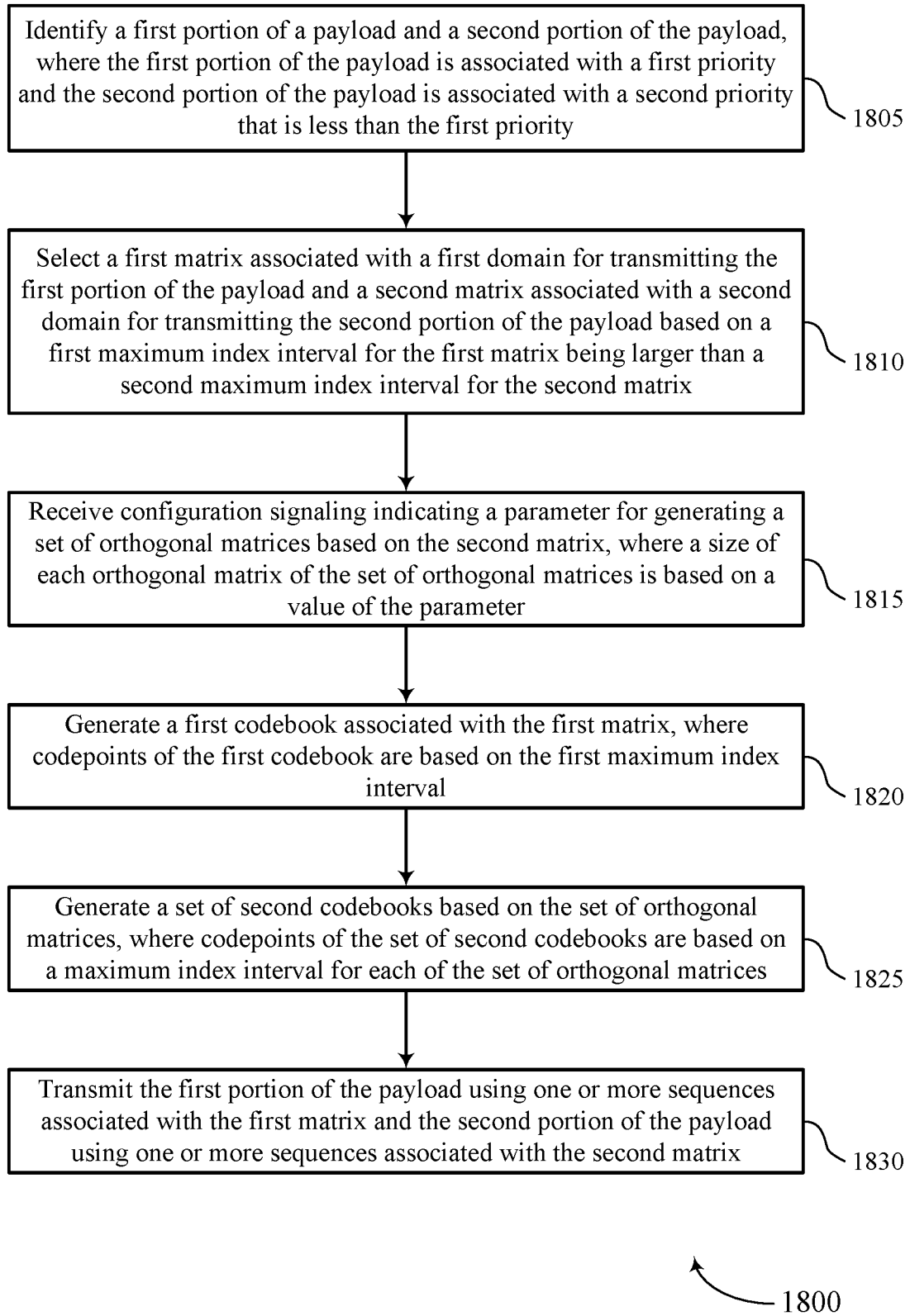

FIG. 18 shows a flowchart illustrating a method 1800 that supports payload multiplexing with orthogonal sequences in accordance with aspects of the present disclosure. The operations of method 1800 may be implemented by a UE 115 or its components as described herein. For example, the operations of method 1800 may be performed by a communication manager as described with reference to FIGS. 8 through 11. In some examples, a UE may execute a set of instructions to control the functional elements of the UE to perform the described functions. Additionally or alternatively, a UE may perform aspects of the described functions using special-purpose hardware.

At 1805, the UE may identify a first portion of a payload and a second portion of the payload, where the first portion of the payload is associated with a first priority and the second portion of the payload is associated with a second priority that is less than the first priority. The operations of 1805 may be performed according to the methods described herein. In some examples, aspects of the operations of 1805 may be performed by a payload identification component as described with reference to FIGS. 8 through 11.

At 1810, the UE may select a first matrix associated with a first domain for transmitting the first portion of the payload and a second matrix associated with a second domain for transmitting the second portion of the payload based on a first maximum index interval for the first matrix being larger than a second maximum index interval for the second matrix. The operations of 1810 may be performed according to the methods described herein. In some examples, aspects of the operations of 1810 may be performed by a matrix selection component as described with reference to FIGS. 8 through 11.

At 1815, the UE may receive configuration signaling indicating a parameter for generating a set of orthogonal matrices based on the second matrix, where a size of each orthogonal matrix of the set of orthogonal matrices is based on a value of the parameter. The operations of 1815 may be performed according to the methods described herein. In some examples, aspects of the operations of 1815 may be performed by an orthogonal matrix configuration receiver as described with reference to FIGS. 8 through 11.

At 1820, the UE may generate a first codebook associated with the first matrix, where codepoints of the first codebook are based on the first maximum index interval. The operations of 1820 may be performed according to the methods described herein. In some examples, aspects of the operations of 1820 may be performed by a codebook generator as described with reference to FIGS. 8 through 11.

At 1825, the UE may generate a set of second codebooks based on the set of orthogonal matrices, where codepoints of the set of second codebooks are based on a maximum index interval for each of the set of orthogonal matrices. The operations of 1825 may be performed according to the methods described herein. In some examples, aspects of the operations of 1825 may be performed by a codebook generator as described with reference to FIGS. 8 through 11.

At 1830, the UE may transmit the first portion of the payload using one or more sequences associated with the first matrix and the second portion of the payload using one or more sequences associated with the second matrix. The operations of 1830 may be performed according to the methods described herein. In some examples, aspects of the operations of 1830 may be performed by a payload transmitter as described with reference to FIGS. 8 through 11.

Figure 19:
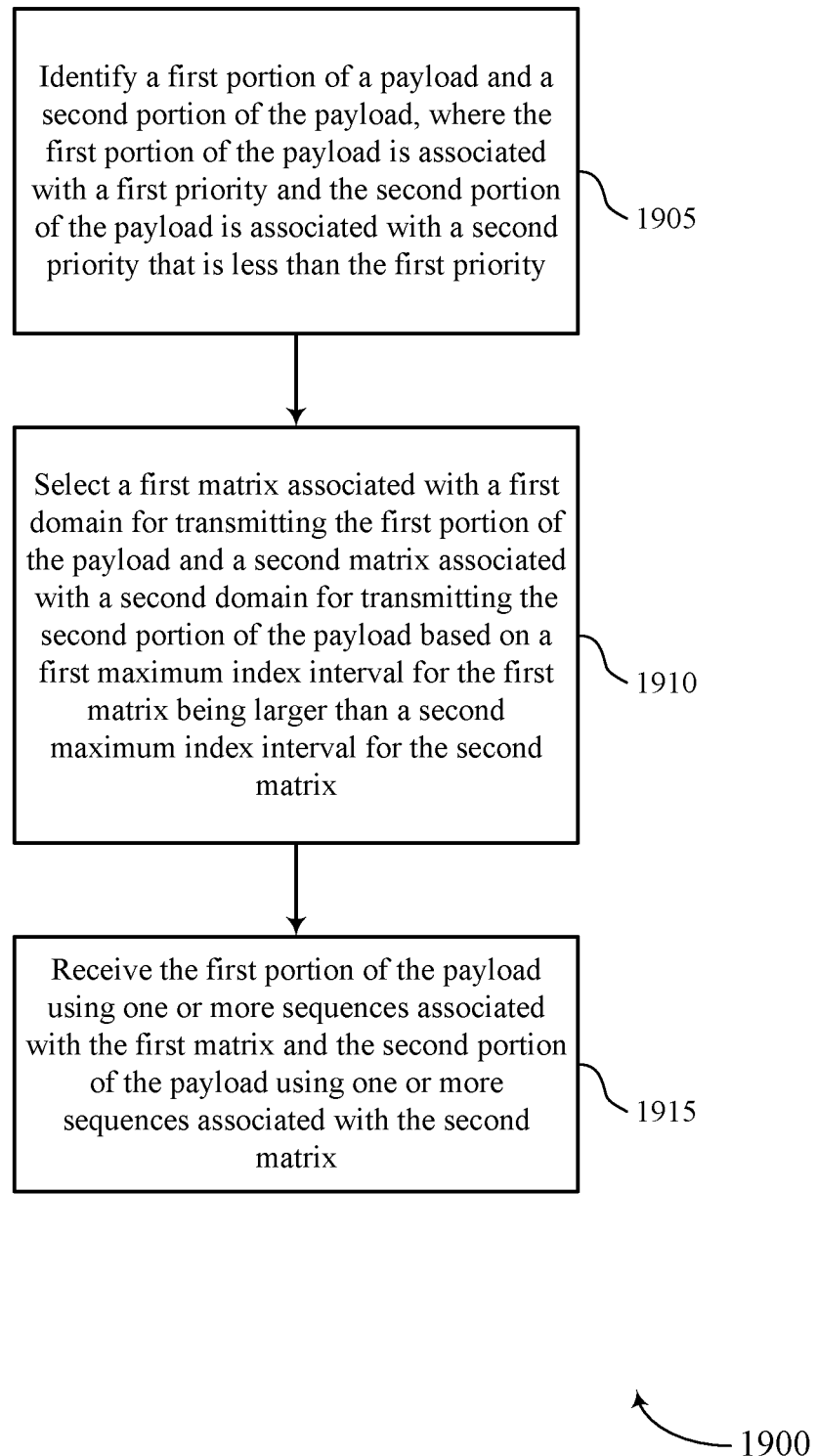

FIG. 19 shows a flowchart illustrating a method 1900 that supports payload multiplexing with orthogonal sequences in accordance with aspects of the present disclosure. The operations of method 1900 may be implemented by a base station 105 or its components as described herein. For example, the operations of method 1900 may be performed by a communication manager as described with reference to FIGS. 12 through 15. In some examples, a base station may execute a set of instructions to control the functional elements of the base station to perform the described functions. Additionally or alternatively, a base station may perform aspects of the described functions using special-purpose hardware.

At 1905, the base station may identify a first portion of a payload and a second portion of the payload, where the first portion of the payload is associated with a first priority and the second portion of the payload is associated with a second priority that is less than the first priority. The operations of 1905 may be performed according to the methods described herein. In some examples, aspects of the operations of 1905 may be performed by a payload identification component as described with reference to FIGS. 12 through 15.

At 1910, the base station may select a first matrix associated with a first domain for transmitting the first portion of the payload and a second matrix associated with a second domain for transmitting the second portion of the payload based on a first maximum index interval for the first matrix being larger than a second maximum index interval for the second matrix. The operations of 1910 may be performed according to the methods described herein. In some examples, aspects of the operations of 1910 may be performed by a matrix selection component as described with reference to FIGS. 12 through 15.

At 1915, the base station may receive the first portion of the payload using one or more sequences associated with the first matrix and the second portion of the payload using one or more sequences associated with the second matrix. The operations of 1915 may be performed according to the methods described herein. In some examples, aspects of the operations of 1915 may be performed by a payload receiver as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous examples or aspects described herein.

Example 1: A method for wireless communications, comprising: identifying a first portion of a payload and a second portion of the payload, wherein the first portion of the payload is associated with a first priority and the second portion of the payload is associated with a second priority that is less than the first priority; selecting a first matrix associated with a first domain for transmitting the first portion of the payload and a second matrix associated with a second domain for transmitting the second portion of the payload based at least in part on a first maximum index interval for the first matrix being larger than a second maximum index interval for the second matrix; and transmitting the first portion of the payload using one or more sequences associated with the first matrix and the second portion of the payload using one or more sequences associated with the second matrix.

Example 2: The method of example 1, further comprising: receiving configuration signaling indicating a parameter for generating a plurality of orthogonal matrices based at least in part on the second matrix, wherein a size of each orthogonal matrix of the plurality of orthogonal matrices is based at least in part on a value of the parameter.

Example 3: The method of any of examples 1 or 2, further comprising: generating a first codebook associated with the first matrix, wherein codepoints of the first codebook are based at least in part on the first maximum index interval; and generating a plurality of second codebooks based at least in part on the plurality of orthogonal matrices, wherein codepoints of the plurality of second codebooks are based at least in part on a maximum index interval for each of the plurality of orthogonal matrices.

Example 4: The method of any of examples 1 to 3, further comprising: transmitting a first subset of the second portion of the payload using a first sequence from a first codebook of the plurality of second codebooks and a second subset of the second portion of the payload using a second sequence from a second codebook of the plurality of second codebooks.

Example 5: The method of any of examples 1 to 4, further comprising: transmitting the first subset of the second portion of the payload over a first frequency portion associated with a frequency hopping configuration and the second portion of the payload using a second frequency portion associated with the frequency hopping configuration; and transmitting the first portion of the payload over the first frequency portion using an encoding scheme and the first portion of the payload over the second frequency portion using the encoding scheme.

Example 6: The method of any of examples 1 to 5, further comprising: receiving configuration signaling indicating an ordering of the first subset of the second portion of the payload and the first portion of the payload over the first frequency portion and an ordering of the second subset of the second portion of the payload and the first portion of the payload over the second frequency portion.

Example 7: The method of any of examples 1 to 6, wherein the ordering of the first subset of the second portion of the payload and the first portion of the payload over the first frequency portion indicates that the first portion of the payload over the first frequency portion is ordered before the first subset of the second portion of the payload, and wherein the ordering of the second subset of the second portion of the payload and the first portion of the payload over the second frequency portion indicates that the first portion of the payload over the second frequency portion is ordered before the second subset of the second portion of the payload.

Example 8: The method of any of examples 1 to 7, further comprising: generating a first joint codebook based at least in part on the first codebook associated with the first matrix and the first codebook of the plurality of second codebooks, wherein the first portion of the payload over the first frequency portion and the first subset of the second portion of the payload are transmitted using the first joint codebook; and generating a second joint codebook based at least in part on the first codebook associated with the first matrix and the second codebook of the plurality of second codebooks, wherein the first portion of the payload over the second frequency portion and the second subset of the second portion of the payload are transmitted using the second joint codebook.

Example 9: The method of any of examples 1 to 8, wherein the encoding scheme is a repetition coding scheme, a Reed-Muller encoding scheme, a polar encoding scheme, or a combination thereof.

Example 10: The method of any of examples 1 to 9, further comprising: receiving configuration signaling indicating a mapping between the first portion of the payload and the first matrix and a mapping between the second portion of the payload and the second matrix.

Example 11: The method of any of examples 1 to 10, wherein the first maximum index interval is based at least in part on a size of the first matrix and a first number of bits associated with the first portion of a payload; and the second maximum index interval is based at least in part on a size of the second matrix and a second number of bits associated with the second portion of a payload.

Example 12: The method of any of examples 1 to 11, wherein the first portion of the payload comprises feedback process information and the second portion of the payload comprises channel state information.

Example 13: The method of any of examples 1 to 12, wherein the first portion of the payload is associated with a higher reliability requirement than the second portion of the payload.

Example 14: An apparatus comprising at least one means for performing a method of any of examples 1 to 13.

Example 15: An apparatus for wireless communications comprising a processor; memory coupled with the processor; and instructions stored in the memory and executable by the processor to cause the apparatus to perform a method of any of examples 1 to 13.

Example 16: A non-transitory computer-readable medium storing code for wireless communications, the code comprising instructions executable by a processor to perform a method of any of examples 1 to 13.

Example 17: A method for wireless communications, comprising: identifying a first portion of a payload and a second portion of the payload, wherein the first portion of the payload is associated with a first priority and the second portion of the payload is associated with a second priority that is less than the first priority; selecting a first matrix associated with a first domain for transmitting the first portion of the payload and a second matrix associated with a second domain for transmitting the second portion of the payload based at least in part on a first maximum index interval for the first matrix being larger than a second maximum index interval for the second matrix; and receiving the first portion of the payload using one or more sequences associated with the first matrix and the second portion of the payload using one or more sequences associated with the second matrix.

Example 18: The method of example 17, further comprising: transmitting configuration signaling indicating a parameter for generating a plurality of orthogonal matrices based at least in part on the second matrix, wherein a size of each orthogonal matrix of the plurality of orthogonal matrices is based at least in part on a value of the parameter.

Example 19: The method of examples 17 or 18, further comprising: generating a first codebook associated with the first matrix, wherein codepoints of the first codebook are based at least in part on the first maximum index interval; and generating a plurality of second codebooks based at least in part on the plurality of orthogonal matrices, wherein codepoints of the plurality of second codebooks are based at least in part on a maximum index interval for each of the plurality of orthogonal matrices.

Example 20: The method of any of examples 17 to 19, further comprising: receiving a first subset of the second portion of the payload using a first sequence from a first codebook of the plurality of second codebooks and a second subset of the second portion of the payload using a second sequence from a second codebook of the plurality of second codebooks.

Example 21: The method of any of examples 17 to 20, further comprising: receiving the first subset of the second portion of the payload over a first frequency portion associated with a frequency hopping configuration and the second portion of the payload using a second frequency portion associated with the frequency hopping configuration; and receiving the first portion of the payload over the first frequency portion using an encoding scheme and the first portion of the payload over the second frequency portion using the encoding scheme.

Example 22: The method of any of examples 17 to 21, further comprising: transmitting configuration signaling indicating an ordering of the first subset of the second portion of the payload and the first portion of the payload over the first frequency portion and an ordering of the second subset of the second portion of the payload and the first portion of the payload over the second frequency portion.

Example 23: The method of any of examples 17 to 22, wherein the ordering of the first subset of the second portion of the payload and the first portion of the payload over the first frequency portion indicates that the first portion of the payload over the first frequency portion is ordered before the first subset of the second portion of the payload, and wherein the ordering of the second subset of the second portion of the payload and the first portion of the payload over the second frequency portion indicates that the first portion of the payload over the second frequency portion is ordered before the second subset of the second portion of the payload.

Example 24: The method of any of examples 17 to 23, further comprising: generating a first joint codebook based at least in part on the first codebook associated with the first matrix and the first codebook of the plurality of second codebooks, wherein the first the first portion of the payload over the first frequency portion and the first subset of the second portion of the payload are received using the first joint codebook; and generating a second joint codebook based at least in part on the first codebook associated with the first matrix and the second codebook of the plurality of second codebooks, wherein the first portion of the payload over the second frequency portion and the second subset of the second portion of the payload are received using the second joint codebook.

Example 25: The method of any of examples 17 to 24, wherein the encoding scheme is a repetition coding scheme, a Reed-Muller encoding scheme, a polar encoding scheme, or a combination thereof.

Example 26: The method of any of examples 17 to 25, further comprising: transmitting configuration signaling indicating a mapping between the first portion of the payload and the first matrix and a mapping between the second portion of the payload and the second matrix.

Example 27: The method of any of examples 17 to 26, wherein the first maximum index interval is based at least in part on a size of the first matrix and a first number of bits associated with the first portion of a payload; and the second maximum index interval is based at least in part on a size of the second matrix and a second number of bits associated with the second portion of a payload.

Example 28: The method of any of examples 17 to 27, wherein the first portion of the payload comprises feedback process information and the second portion of the payload comprises channel state information.

Example 29: The method of any of examples 17 to 28, wherein the first portion of the payload is associated with a higher reliability requirement than the second portion of the payload.

Example 30: An apparatus comprising at least one means for performing a method of any of examples 17 to 29.

Example 31: An apparatus for wireless communications comprising a processor; memory coupled with the processor; and instructions stored in the memory and executable by the processor to cause the apparatus to perform a method of any of examples 17 to 29.

Example 32: A non-transitory computer-readable medium storing code for wireless communications, the code comprising instructions executable by a processor to perform a method of any of examples 17 to 29.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    identifying a first portion of a payload and a second portion of the payload, wherein the first portion of the payload is associated with a first priority and the second portion of the payload is associated with a second priority that is less than the first priority;
    selecting a first matrix associated with a first domain for transmitting the first portion of the payload and a second matrix associated with a second domain for transmitting the second portion of the payload based at least in part on a first maximum index interval for the first matrix being larger than a second maximum index interval for the second matrix; and
    transmitting the first portion of the payload using one or more sequences associated with the first matrix and the second portion of the payload using one or more sequences associated with the second matrix.

2. The method of claim 1, further comprising:
    receiving configuration signaling indicating a parameter for generating a plurality of orthogonal matrices based at least in part on the second matrix, wherein a size of each orthogonal matrix of the plurality of orthogonal matrices is based at least in part on a value of the parameter.

3. The method of claim 2, further comprising:
    generating a first codebook associated with the first matrix, wherein codepoints of the first codebook are based at least in part on the first maximum index interval; and
    generating a plurality of second codebooks based at least in part on the plurality of orthogonal matrices, wherein codepoints of the plurality of second codebooks are based at least in part on a maximum index interval for each of the plurality of orthogonal matrices.

4. The method of claim 3, further comprising:
    transmitting a first subset of the second portion of the payload using a first sequence from a first codebook of the plurality of second codebooks and a second subset of the second portion of the payload using a second sequence from a second codebook of the plurality of second codebooks.

5. The method of claim 4, further comprising:
    transmitting the first subset of the second portion of the payload over a first frequency portion associated with a frequency hopping configuration and the second portion of the payload using a second frequency portion associated with the frequency hopping configuration; and transmitting the first portion of the payload over the first frequency portion using an encoding scheme and the first portion of the payload over the second frequency portion using the encoding scheme.

6. The method of claim 5, further comprising:
receiving configuration signaling indicating an ordering of the first subset of the second portion of the payload and the first portion of the payload over the first frequency portion and an ordering of the second subset of the second portion of the payload and the first portion of the payload over the second frequency portion.

7. The method of claim 6, wherein the ordering of the first subset of the second portion of the payload and the first portion of the payload over the first frequency portion indicates that the first portion of the payload over the first frequency portion is ordered before the first subset of the second portion of the payload, and wherein the ordering of the second subset of the second portion of the payload and the first portion of the payload over the second frequency portion indicates that the first portion of the payload over the second frequency portion is ordered before the second subset of the second portion of the payload.

8. The method of claim 5, further comprising:
generating a first joint codebook based at least in part on the first codebook associated with the first matrix and the first codebook of the plurality of second codebooks, wherein the first portion of the payload over the first frequency portion and the first subset of the second portion of the payload are transmitted using the first joint codebook; and
generating a second joint codebook based at least in part on the first codebook associated with the first matrix and the second codebook of the plurality of second codebooks, wherein the first portion of the payload over the second frequency portion and the second subset of the second portion of the payload are transmitted using the second joint codebook.

9. The method of claim 5, wherein the encoding scheme is a repetition coding scheme, a Reed-Muller encoding scheme, a polar encoding scheme, or a combination thereof.

10. The method of claim 3, further comprising:
receiving configuration signaling indicating a mapping between the first portion of the payload and the first matrix and a mapping between the second portion of the payload and the second matrix.

11. The method of claim 1, wherein:
the first maximum index interval is based at least in part on a size of the first matrix and a first number of bits associated with the first portion of the payload; and
the second maximum index interval is based at least in part on a size of the second matrix and a second number of bits associated with the second portion of the payload.

12. The method of claim 1, wherein the first portion of the payload comprises feedback process information and the second portion of the payload comprises channel state information.

13. The method of claim 1, wherein the first portion of the payload is associated with a higher reliability requirement than the second portion of the payload.

14. A method for wireless communications at a base station, comprising:
identifying a first portion of a payload and a second portion of the payload, wherein the first portion of the payload is associated with a first priority and the second portion of the payload is associated with a second priority that is less than the first priority;
selecting a first matrix associated with a first domain for transmitting the first portion of the payload and a second matrix associated with a second domain for transmitting the second portion of the payload based at least in part on a first maximum index interval for the first matrix being larger than a second maximum index interval for the second matrix; and
receiving the first portion of the payload using one or more sequences associated with the first matrix and the second portion of the payload using one or more sequences associated with the second matrix.

15. The method of claim 14, further comprising:
transmitting configuration signaling indicating a parameter for generating a plurality of orthogonal matrices based at least in part on the second matrix, wherein a size of each orthogonal matrix of the plurality of orthogonal matrices is based at least in part on a value of the parameter.

16. The method of claim 15, further comprising:
generating a first codebook associated with the first matrix, wherein codepoints of the first codebook are based at least in part on the first maximum index interval; and
generating a plurality of second codebooks based at least in part on the plurality of orthogonal matrices, wherein codepoints of the plurality of second codebooks are based at least in part on a maximum index interval for each of the plurality of orthogonal matrices.

17. The method of claim 16, further comprising:
receiving a first subset of the second portion of the payload using a first sequence from a first codebook of the plurality of second codebooks and a second subset of the second portion of the payload using a second sequence from a second codebook of the plurality of second codebooks.

18. The method of claim 17, further comprising:
receiving the first subset of the second portion of the payload over a first frequency portion associated with a frequency hopping configuration and the second portion of the payload using a second frequency portion associated with the frequency hopping configuration; and
receiving the first portion of the payload over the first frequency portion using an encoding scheme and the first portion of the payload over the second frequency portion using the encoding scheme.

19. The method of claim 18, further comprising:
transmitting configuration signaling indicating an ordering of the first subset of the second portion of the payload and the first portion of the payload over the first frequency portion and an ordering of the second subset of the second portion of the payload and the first portion of the payload over the second frequency portion.

20. The method of claim 19, wherein the ordering of the first subset of the second portion of the payload and the first portion of the payload over the first frequency portion indicates that the first portion of the payload over the first frequency portion is ordered before the first subset of the second portion of the payload, and wherein the ordering of the second subset of the second portion of the payload and the first portion of the payload over the second frequency portion indicates that the first portion of the payload over the second frequency portion is ordered before the second subset of the second portion of the payload.

21. The method of claim 18, further comprising:
generating a first joint codebook based at least in part on the first codebook associated with the first matrix and the first codebook of the plurality of second codebooks, wherein the first the first portion of the payload over the first frequency portion and the first subset of the second portion of the payload are received using the first joint codebook; and
generating a second joint codebook based at least in part on the first codebook associated with the first matrix and the second codebook of the plurality of second codebooks, wherein the first portion of the payload over the second frequency portion and the second subset of the second portion of the payload are received using the second joint codebook.

22. The method of claim 18, wherein the encoding scheme is a repetition coding scheme, a Reed-Muller encoding scheme, a polar encoding scheme, or a combination thereof.

23. The method of claim 16, further comprising:
transmitting configuration signaling indicating a mapping between the first portion of the payload and the first matrix and a mapping between the second portion of the payload and the second matrix.

24. The method of claim 14, wherein:
the first maximum index interval is based at least in part on a size of the first matrix and a first number of bits associated with the first portion of the payload; and
the second maximum index interval is based at least in part on a size of the second matrix and a second number of bits associated with the second portion of the payload.

25. The method of claim 14, wherein the first portion of the payload comprises feedback process information and the second portion of the payload comprises channel state information.

26. The method of claim 14, wherein the first portion of the payload is associated with a higher reliability requirement than the second portion of the payload.

27. An apparatus for wireless communications at a user equipment (UE), comprising:
a processor,
memory in electronic communication with the processor, and
instructions stored in the memory and executable by the processor to cause the apparatus to:
identify a first portion of a payload and a second portion of the payload, wherein the first portion of the payload is associated with a first priority and the second portion of the payload is associated with a second priority that is less than the first priority;
select a first matrix associated with a first domain for transmitting the first portion of the payload and a second matrix associated with a second domain for transmitting the second portion of the payload based at least in part on a first maximum index interval for the first matrix being larger than a second maximum index interval for the second matrix; and
transmit the first portion of the payload using one or more sequences associated with the first matrix and the second portion of the payload using one or more sequences associated with the second matrix.

28. The apparatus of claim 27, wherein the instructions are further executable by the processor to cause the apparatus to:
receive configuration signaling indicating a parameter for generating a plurality of orthogonal matrices based at least in part on the second matrix, wherein a size of each orthogonal matrix of the plurality of orthogonal matrices is based at least in part on a value of the parameter.

29. An apparatus for wireless communications at a base station, comprising:
a processor,
memory in electronic communication with the processor, and
instructions stored in the memory and executable by the processor to cause the apparatus to:
identify a first portion of a payload and a second portion of the payload, wherein the first portion of the payload is associated with a first priority and the second portion of the payload is associated with a second priority that is less than the first priority;
select a first matrix associated with a first domain for transmitting the first portion of the payload and a second matrix associated with a second domain for transmitting the second portion of the payload based at least in part on a first maximum index interval for the first matrix being larger than a second maximum index interval for the second matrix; and
receive the first portion of the payload using one or more sequences associated with the first matrix and the second portion of the payload using one or more sequences associated with the second matrix.

30. The apparatus of claim 29, wherein the instructions are further executable by the processor to cause the apparatus to:
transmit configuration signaling indicating a parameter for generating a plurality of orthogonal matrices based at least in part on the second matrix, wherein a size of each orthogonal matrix of the plurality of orthogonal matrices is based at least in part on a value of the parameter.

* * * * *